US011225564B2

(12) United States Patent
Gottlieb et al.

(10) Patent No.: US 11,225,564 B2
(45) Date of Patent: Jan. 18, 2022

(54) ADDITIVES FOR PROTECTION OF POLYMERS AGAINST ULTRAVIOLET LIGHT

(71) Applicant: B.G. NEGEV TECHNOLOGIES AND APPLICATIONS LTD., AT BEN-GURION UNIVERSITY, Beer-Sheva (IL)

(72) Inventors: Moshe Gottlieb, Omer (IL); Olga Iliashevsky, Beer-Sheva (IL); Yafa Yagen, Beer-Sheva (IL)

(73) Assignee: B.G. NEGEV TECHNOLOGIES AND APPLICATIONS LTD., AT BEN-GURION UNIVERSITY, Beer-Sheva (IL)

( * ) Notice: Subject to any disclaimer, the term of this patent is extended or adjusted under 35 U.S.C. 154(b) by 0 days.

(21) Appl. No.: 16/078,982

(22) PCT Filed: Feb. 27, 2017

(86) PCT No.: PCT/IL2017/050247
§ 371 (c)(1),
(2) Date: Aug. 22, 2018

(87) PCT Pub. No.: WO2017/145169
PCT Pub. Date: Aug. 31, 2017

(65) Prior Publication Data
US 2019/0048169 A1  Feb. 14, 2019

Related U.S. Application Data

(60) Provisional application No. 62/300,843, filed on Feb. 28, 2016.

(51) Int. Cl.
| | | |
|---|---|---|
| C08K 9/06 | (2006.01) | |
| C08K 9/12 | (2006.01) | |
| C08J 5/18 | (2006.01) | |
| C08K 9/04 | (2006.01) | |
| C08K 3/36 | (2006.01) | |
| C08K 5/3475 | (2006.01) | |
| C08K 5/132 | (2006.01) | |

(52) U.S. Cl.
CPC ............... *C08K 9/06* (2013.01); *C08J 5/18* (2013.01); *C08K 9/04* (2013.01); *C08K 9/12* (2013.01); *C08J 2323/06* (2013.01); *C08J 2323/08* (2013.01); *C08J 2323/12* (2013.01); *C08K 3/36* (2013.01); *C08K 5/132* (2013.01); *C08K 5/3475* (2013.01)

(58) Field of Classification Search
None
See application file for complete search history.

(56) References Cited

U.S. PATENT DOCUMENTS

| | | | |
|---|---|---|---|
| 5,691,435 A | 11/1997 | Herzig et al. | |
| 6,685,924 B2 | 2/2004 | Buchholz et al. | |
| 8,962,140 B2 | 2/2015 | Müller et al. | |
| 2004/0204521 A1 | 10/2004 | Camenzind et al. | |
| 2006/0159926 A1 | 7/2006 | Funaki et al. | |
| 2008/0260664 A1* | 10/2008 | Walenzyk | A61K 8/0283 424/60 |
| 2008/0280149 A1 | 11/2008 | Higuchi et al. | |
| 2011/0297228 A1* | 12/2011 | Li | B32B 27/18 136/259 |
| 2012/0021027 A1* | 1/2012 | Hodgson | A61K 8/4946 424/401 |
| 2013/0296453 A1 | 11/2013 | Giesenberg et al. | |

FOREIGN PATENT DOCUMENTS

| | | |
|---|---|---|
| CN | 1522276 A | 8/2004 |
| CN | 101469249 A | 7/2009 |
| CN | 202784136 U | 3/2013 |
| CN | 104010722 A | 8/2014 |
| EP | 2873704 A1 | 5/2015 |
| JP | 2013-075453 A | 4/2013 |
| JP | 2013-166889 A | 8/2013 |
| JP | 2013-190542 A | 9/2013 |
| WO | 2009101016 A2 | 8/2009 |

OTHER PUBLICATIONS

Machine Translation of JP 2013_166889 Makato et al. (Year: 2013).*
Supplementary European Search Report issued for European Patent Application No. 17755953.1 dated Sep. 9, 2019, 8 pages.
Search Report and Written Opinion issued for PCT/IL2017/050247 dated May 22, 2017, 10 pages.
Search Report issued for Chinese Patent Application No. 201780013323. 6, 3 pages.
Caplus Abstract of JP 2013-166889, Terauchi, Makoto, Mitsubishi Chemical Corp., Japan, Aug. 29, 2013, (1 page).
Machine translation of JP 2013-166889, Aug. 29, 2013, (43 pages).
PemulenTM TR-2 NF Polymer, Lubrizol Product Specification, 2020, 2 pages ("Appendix A").
Molecular Weight of Carbopol® and Pemulen® polymers, Lubrizol Technical Data Sheet, TDS-222, 2007, 3 pages ("Appendix B").
"Final Report on the Safety Assessment of Polyethylene Glycols (PEGs) -6, -8, -32, -75, -150,-14M, -20M", Journal of the American College of Toxicology vol. 12, No. 5, 1993 ("Appendix C").

* cited by examiner

*Primary Examiner* — Robert T Butcher
(74) *Attorney, Agent, or Firm* — Rothwell, Figg, Ernst & Manbeck, P.C.

(57) ABSTRACT

The invention provides ultraviolet light absorber suitable for use as an additive in polymers, comprising particles of inorganic oxide having UV light-absorbing compound on their surface, wherein said UV light-absorbing compound is chemically bonded, either to a spacer provided on the surface of said particle, or directly to the surface of the particle. Process for preparing the additive absorber and a thermoplastic polymer (e.g., a film) comprising the absorber additive are also provided.

18 Claims, 12 Drawing Sheets

ADDITIVES FOR PROTECTION OF POLYMERS AGAINST ULTRAVIOLET LIGHT

CROSS REFERENCE TO RELATED APPLICATION(S)

The present application is a 35 U.S.C. § 371 National Phase Entry Application from PCT/IL2017/050247, filed on Feb. 27, 2017, and designating the United States, which claims the benefits of priority to U.S. Application No. 62/300,843, filed on Feb. 28, 2016, which are incorporated herein by reference in their entirety for all purposes.

Different additives are incorporated into polymers in commercial use, to facilitate processing and improve the properties of the finished product. For example, compounds absorbing UV light are customarily added to protect the plastic material from UV radiation, thereby protecting products packaged by the plastic material, such as food products, which are adversely affected by UV radiation.

Some additives tend to separate from the bulk polymer and migrate to the surface of the polymer. For this reason, polymer compositions must be tested under severe storage conditions to measure the occurrence of this surface migration.

Surface migration of additives is particularly unacceptable in food packaging materials. Consequently, it has been proposed that UV absorbers (UVA) intended for use as additives in food packaging materials be chemically modified to increase their size, in an effort to reduce their migration to the surface. Another approach consists of structurally modifying the packaging material (as shown in JP 2013075453 and CN 202784136), for example, by using a laminated packaging material composed of a plurality of layers, having UVA-free layer applied on top of the UVA-containing layer.

It has now been found that UV light absorbing compounds can be covalently bound to the surface of inorganic oxide particles (e.g., silica, zinc oxide); optionally with the aid of suitable spacer groups and that the so-formed particles can be compounded with various polymers to form articles—especially polymer films—displaying very low surface migration of the UV absorbers. For example, experimental work conducted in support of this invention shows that additive-incorporated polypropylene and linear low density polyethylene (LLDPE) films are capable of maintaining essentially constant level of UV-blocking over time, with no surface migration of the UV light absorbing compounds being detected during the testing period.

Covalent binding of active molecules, including light absorbing organic compounds, to the surface of silicon dioxide particles has been reported (U.S. Pat. No. 6,685,924 in the name of Merck), for the purpose of forming conjugates for use in dermatological and cosmetic preparations. An exemplary conjugate has the following structure:

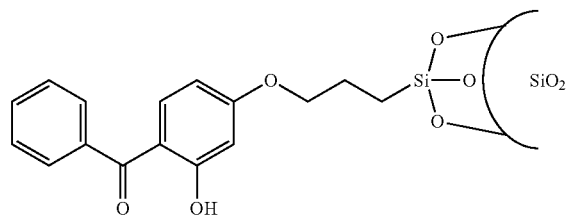

US 2008/0260664 describes inorganic particles (e.g., silicon dioxide) functionalized with organic compounds, including light absorbent compounds. The organic compounds are predominantly present in the core of the particle.

It has now been found that UV light absorbing compounds (for example, of the benzotriazole and benzophenone classes), can be covalently attached to the surface of inorganic oxide particles, either through sequential surface modification of the particles, followed by reaction of the modified surface with the UV light absorbing compound (herein named the 'sequential surface modification variant' or the 'first variant'), or by directly reacting the UV light absorbing compound with unmodified inorganic oxide particles (herein named the 'one-step variant' or 'the second variant'). In any case, the resultant particles having the UV light absorbing compounds on their surface are useful as an additive to modify the properties of polymers in commercial use, i.e., to improve light stability.

Accordingly, the invention is primarily directed to ultraviolet light absorber suitable for use as an additive in polymers, comprising particles of inorganic oxide having UV light-absorbing compound on their surface, wherein said UV light-absorbing compound is chemically (covalently) bonded, either to a spacer provided on the surface of said particle, or directly to the surface of the particle. The inorganic oxide is preferably selected from the group consisting of silica and zinc oxide.

Regarding the first variant, silica particles possess surface reactivity due to the presence of hydroxyl groups, or more precisely, silanol groups (SiOH) on their surface, available for chemical bond formation. Preferably, an organosilicon spacer is built onto the silica surface to enable the connection between the surface and the UV light absorbing compound. The spacers may be built onto the silica surface via a sequence of chemical reactions to provide functional groups, which can in turn react with the UV light absorbing compounds. For example, the surface of the silica particles is modified by the introduction of SiH groups. The high chemical reactivity of the silicon hydride bond with multitude of chemical functional groups (olefin, alcohol, aldehyde, ketone) allows the attachment of suitably functionalized UV light absorbing compounds onto the silica particles. By way of example, silicon hydride groups formed onto the silica surface can be added to a carbon-carbon double bond of an olefinic compound possessing UV light absorbing portion.

Silica suitable for use in the first variant of the invention is preferably fumed silica. Properties important for screening fumed silica for use in the first variant of the invention include particle size, specific surface area and concentration of silanol groups on the silica. Hence, silica useful in this variant of the invention is fumed silica, having particle average size of less than 40 nm, e.g., in the range from 5 nm to 35 nm, more specifically in the range from 5 to 20 nm, and even more specifically in the range from 5 to 15 nm, with specific surface area of not less than 150 m$^2$/g, e.g., not less than 200 m$^2$/g., for example, between 200 to 500 m$^2$/g. The concentration of the SiOH groups on the silica surface is preferably not less than 0.7 mmol/g, e.g., not less than 0.8 mmol/g, for example, in the range from 0.8 to 3.0 mmol/g (measured by thermogravimetric analysis). Commercially available fumed silica grades such as Cab-O-Sil® M5 and Cab-O-Sil® EH5 from Cabot Corporation can be used, as well as Aerosil® 200 and Aeroperl® 300/30 from Evonik Industries.

Regarding the second variant, either silica or zinc oxide particles can be employed, that is, this variant of the invention consists of reacting the inorganic oxide particles directly with UV light absorbing compounds that have suitable reactive groups, such as Si—O-alkyl groups. Silica useful for this 'one-step variant' includes the fumed silica with the properties set forth above, for example, Cab-O-Sil® M5 and Cab-O-Sil® EH5. Another type of silica which was tested in the experimental work reported below is colloidal silica, i.e., silica suspended in a solvent. Monodispersed colloidal silica consisting of a population of discrete, spherical, evenly-sized particles may show an advantage in the finished polymer product, owing to its ability to generate uniform distribution of the additive across the polymer product. As shown by the experimental work reported below, we were able to find reaction conditions allowing this type of colloidal silica to react swiftly with UV light absorbing compounds in the same solvent used for suspending colloidal silica in commercial products available on the market.

'The sequential surface modification variant' and 'the one-step variant' are now described in turn.

The sequential surface modification of silica particles comprises the introduction of a first functional group onto the silica surface, followed by a reaction with the UV light absorbing compound; or the introduction of a first functional group onto the silica surface, followed by transformation of said first functional group into a plurality of second functional groups, which in turn react with the UV light absorbing compound.

The second method is generally preferred because each single first functional group is reacted with a molecule bearing a plurality of second functional groups, leading to an increased concentration of the reactive sites ultimately available for chemical bond formation with the UV light absorbing compound.

Accordingly, the invention is primarily directed to a process of preparing ultraviolet light absorber additive for protecting polymers from ultraviolet radiation, comprising introducing onto the surface of inorganic oxide particles a first functional group, reacting the so-formed inorganic particles modified with said first group with a spacer having a plurality of second functional groups; and reacting the so-formed inorganic particles modified with said second functional group with UV light absorbing compound.

To this end, a first functional group—which is preferably a carbon-carbon double bond—is introduced onto the silica surface, by the reaction of silica particles with a vinyl compound, e.g. of the formula $(H_2C=CH)_iSi(OC_jH_{2j+1})_{4-i}$, for example, vinyltrimethoxysilane (i=1, j=1) or trivinylethoxysilane (i=3, j=2). These two vinyl compounds are high boiling point liquids and the reaction may take place in a solvent-free reaction medium, employing the $(H_2C=CH)_iSi(OC_jH_{2j+1})_{4-i}$ in excess to provide a stirrable reaction mixture. Thus, a reaction vessel is charged with silica particles and the vinyl compound, and the reaction proceeds under heating, e.g., at above 100° C., preferably at the reflux temperature, with stirring to afford silica particles bearing vinyl groups. The reaction is brought to completion after several hours. The reaction mixture is cooled down and the surface-modified particles are isolated by filtration, washed to remove excess reactants, and dried.

Next, a spacer bearing a plurality of functional groups is chemically linked to the first functional group present on the surface of the silica particles. The number of functional groups in the spacer is denoted by n, where n is an integer equal to or greater than 3. It should be noted that one of these n functional groups participates in a bond formation reaction with the first functional group present on the surface of the silica particles, thus leaving at most n−1 reaction sites available for bond formation reaction with correspondingly n−1 UV light absorbing compounds. The number of functional groups in the spacer is preferably not less than four (n≥4).

Preferably, the spacer possesses a plurality of functional groups which are identical to one another, for example, a plurality of silicon hydride groups. The silicon hydride functionality has two useful features. First, the addition reaction of silicon hydride to a carbon-carbon double bond (hydrosilylation) proceeds swiftly in the presence of suitable catalysts. Furthermore, as mentioned above, the high chemical reactivity of the silicon hydride groups to be placed onto the silica surface towards a variety of chemical functional groups makes possible the attachment of many different UV light absorbing compounds in the final step of the additive formation. Some exemplary organosilicon spacers which contain a plurality of silicon hydride groups are depicted below:

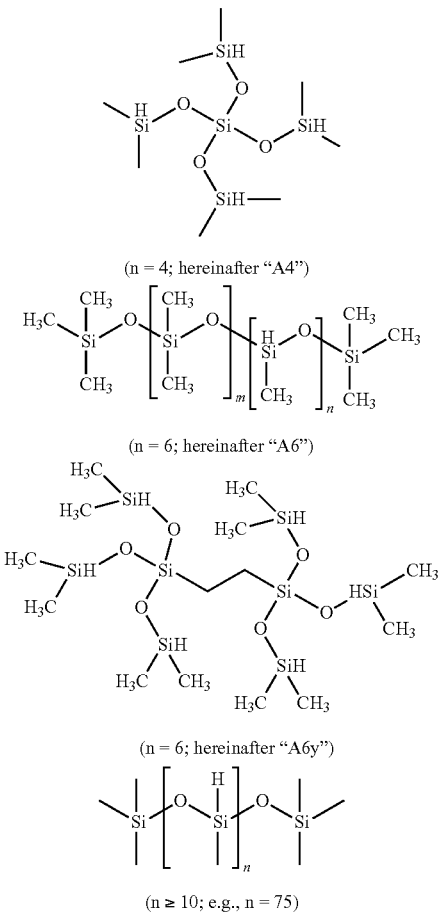

It should be borne in mind that the silica bearing the UV light absorbing compounds is intended for use as an additive in polymers. Hence, the higher the concentration of the UV light absorbing compound that can be loaded onto the surface of the silica particle, the lower the amount of silica additive that is ultimately needed in the finished polymer formulation. Therefore, one major factor affecting the achievable concentration of the UV light absorbing compounds on the surface of the silica is the number of functional groups in the spacer used. Another important property in screening suitable spacers is the compatibility of the silica-spacer-UVA additive with the relevant polymer formulation. Preferably, the number of functional groups in the spacer molecule is from 4 to 80 (4≤n≤80).

One class of spacer molecules operative in the present invention is characterized in that the number of functional groups in the spacer molecules is in the range from 4 to 10, inclusive (4≤n≤10). For 4≤n≤10, bulky spacers are preferred over 'linear' spacers, that is, compounds where the silicon hydride groups are pendent groups, and the nearest environment of the silicon atom in the silicon hydride group is occupied with two hydrocarbyl groups, such as alkyl (e.g., methyl, ethyl) or phenyl, are preferred over compounds where the silicon hydride is part of a backbone chain. The experimental results reported below show almost a twofold increase in concentration of the UV light absorbing compounds in the silica additive on replacing the linear A6 spacer with the 'bulky' A6y spacer (from 0.3 to 0.5 mmol/g).

Another class of spacer molecules operative in the present invention is characterized in that the number of functional groups in the spacer molecule is greater than twenty (n≥20).

These spacer molecules have a long (n≥20) backbone chain in which the silicon hydride group is part of a repeating unit; in particular, poly (methyl hydrogen siloxane), consisting of from ten to eighty repeating units, has emerged from the studies reported below as an excellent spacer. For example, poly (methyl hydrogen slioxane) consisting of about 50-80 (e.g., about 75) silicon hydride groups and preferably end-capped with trimethylsiloxy groups has been shown to increase the concentration of UV light absorbing compounds on the silica surface to about 2 mmol/g. Poly (methyl hydrogen slioxane) suitable for use as spacers in the invention are commercially available, for example, Andisil® MH30 (hereinafter MH30; from AB Specialty Silicones). The experimental results also indicate that the chemical bonding of the UV light absorbing compound to MH30 leads to enhanced thermal stability of the siloxane.

The addition of the spacer to the vinyl functionality provided on the silica surface takes place in a solvent. The solvent is preferably an aromatic hydrocarbon, e.g., alkyl-substituted aromatic hydrocarbon such as toluene. The reaction is carried out under heating, for example at a temperature in the range from 40 to 90° C.

The addition reaction is advanced with the aid of a catalyst, preferably from the group VIII metals, especially platinum. The catalyst is chosen to enable the reaction to proceed smoothly at temperature low enough to minimize side reactions. For example, when the spacer bearing the silicon hydride groups is methyl hydrogen polyslioxane, then the reaction temperature should not exceed 60° C., e.g., around 50° C. Other addition reactions, with the spacers shown above, are allowed to proceed at higher temperatures, e.g., around 70-80° C., with shorter reaction times, e.g., less than 10 hours.

Exemplary Pt catalyst include [(C$_2$H$_5$)$_2$S]$_2$PtCl$_2$, which has proved to be very useful in the addition of silicon hydride-containing spacers to the vinyl-modified silica. It is also possible to use Pt$_2$[(Me$_2$SiCH═CH$_2$)$_2$O]$_3$, which is named Karstedt's catalyst, or commercially available catalysts from Umicore: Umicore HS425 or Umicore HS432. Other transition metal-containing catalysts, such as rhodium or ruthenium-based catalysts can also be used, e.g., [Cp*Ru(MeCN)$_3$]PF$_6$.

The reaction mixture is maintained under stirring at the chosen elevated temperature. Upon completion of the addition reaction, the particles, namely, the silicon hydride-modified silica, are separated from the reaction mixture by filtration, and are optionally washed and dried.

Next, the silicon hydride modified silica is reacted with UV light absorbing compounds. For example, organic compounds of the benzotriazole class are known to absorb UV light in the range from 300 to 400 nm, and can be used in the present invention. Preferred are benzotriazole where the nitrogen atom at position 2 of the benzotriazole fused system is bonded to a substituted phenyl ring. The substituents on the phenyl moiety preferably includes hydroxyl group. Hydroxyphenyl-benzotriazole derivatives display efficient ultraviolent protection in a wide variety of polymers. Thus, more specifically, preferred UV light absorbing compounds for use in the present invention are 2-(2'-hydroxyphenyl) benzotriazole derivatives:

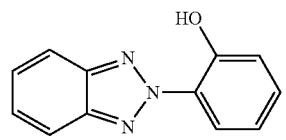 [SMILES: Oc1ccccc1-n1nc2ccccc2n1]

where the phenyl ring is further substituted with a reactive functionality.

Especially preferred are 2-(2'-hydroxyphenyl)benzotriazole derivatives where the 2'-hydroxyphenyl ring is substituted with a functional group displaying high reactivity with silicon hydride, such as vinyl or allyl groups. For example, 2-(3-Allyl-2-hydroxy-5-methyl-phenyl)-2H-benzotriazole [also named 2-(2H-benzotriazol-2-yl)-4-methyl-6-(2-propenyl) phenol], having the structure depicted below:

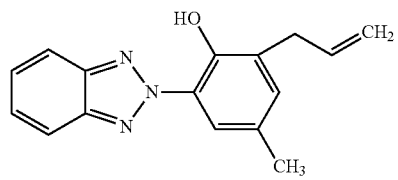 [SMILES: C=CCc1cc(C)cc(-n2nc3ccccc3n2)c1O]

was chemically bonded to the silica particle through the addition of silicon hydride groups of the spacer to the carbon-carbon double bond of the allyl group. Thus, the silicon hydride surface modified-silica particles and the 2-(2'-hydroxyphenyl)benzotriazole UV light absorbing compound are combined together in an organic solvent in the presence of a suitable catalyst (e.g., Pt catalyst as set forth above). For example, the catalyst is added to a reaction vessel which was previously charged with the silica and the 2-(2'-hydroxyphenyl)benzotriazole derivative in aromatic hydrocarbon and the reaction mixture is maintained under heating with stirring to complete the addition reaction. The product, consisting of the silica particles with the UV light absorbing compound chemically attached thereto is separated by filtration, washed and dried. The filtrate is collected to recover non-reacted UV light absorbing compound therefrom.

'The sequential surface modification variant' produces, in its most preferred embodiment, a light stabilizer suitable for use as an additive in polymers. This light stabilizer forms a specific embodiment of the invention; it comprises a silica particle having UV light absorbing compound on the particle surface, wherein a carbon atom of the UV light absorbing compound is covalently bonded to a silicon atom of an organosilicon spacer, characterized in that the nearest environment of said silicon atom consists, in addition to said carbon atom, of either one oxygen atom and two hydrocarbyl groups or two oxygen atoms and one hydrocarbyl group. Hydrocarbyl group includes, but is not limited to alkyl (such as methyl or ethyl) and phenyl. More specifically, the UVA light absorbing compound is 2-(2'-hydroxyphenyl)benzotriazole compound that is covalently bonded to the silicon atom of the organosilicon spacer through an alkylene chain (—CH$_2$—)$_n$, n=2-5, e.g., n=3, attached to the phenyl ring of said hydroxyphenyl-benzotriazole compound.

Preferably, the concentration of the UV light absorbing compound in the silica is not less than 0.07 mmol/g, e.g., not less than 0.15 mmol/g, more preferably not less than 0.2 mmol/g, for example, in the range from 0.2 to 3.0 mmol/g, e.g., from 0.3 to 0.7 mmol/g or from 2.0 mmol/g to 2.5 mmol/g (measured by TGA as exemplified below). The additive may also contain some silicon hydride groups.

Turning now to the 'one-step variant', it is based on a direct reaction of the UV light absorbing compound with unmodified silica particles or zinc oxide particles. Any UV light absorbing compound which possesses a functional group capable of bond formation reaction with surface —OH group can be used in the 'one-step variant', such as UV light absorbing compound which is substituted with —Si(—O-alkyl)$_3$, for example, —Si(—O—C$_2$H$_5$)$_3$. Below are depicted two UV light absorbing compounds bearing the —Si(—O—C$_2$H$_5$)$_3$ functionality, one of the 2-hydroxy benzophenone class and the other of the 2-(2'-hydroxyphenyl) benzotriazole class:

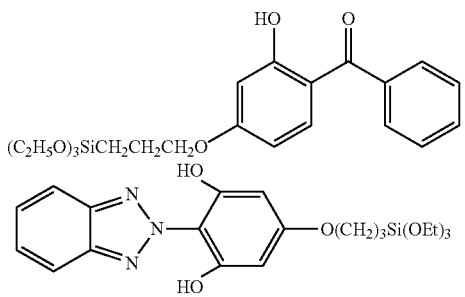

[the above depicted 2'-hydroxyphenyl)benzotriazole was described by Farkas et al. in Molecules (15), p. 6205-6216 (2010)]

Accordingly, inorganic oxide such as silica or zinc oxide is combined with the UV light absorbing compound in a suitable organic solvent, e.g., in an aromatic hydrocarbon such as toluene, with stirring and under heating, preferably at the solvent boiling point under reflux. On completion, the reaction mixture is cooled down and the product is isolated from the liquid phase, washed and dried.

Alternatively, the 'one-step variant' is accomplished with a commercially available colloidal silica as a starting material, with the reaction between the silica and the UV light absorbing compound taking place in the solvent in which the colloidal silica is suspended in a commercially available product (with typical concentrations of 25-40% by weight). In this way, it is possible to load onto the silica particle not less than 0.10 mmol UV light absorbing compound per gram silica. For example, isopropanol has shown to be a useful solvent for the reaction. A mixture of ethylene glycol and isopropanol is also workable. Other solvents, e.g., alkanols and aromatic hydrocarbons such as toluene may also be used. The molar ratio between the OH surface groups of the silica and the UV light absorbing compound (such as 2-Hydroxy-4-(3-triethoxysilylpropoxy)-diphenylketone) is preferably in the range from 8:1 to 2:1, for example, from 3.5:1 to 2.5:1. The reaction is allowed to proceed for about twenty four hours under heating, e.g. at the reflux.

The invention also provides a method for improving the light stability of a polymer, comprising adding to the polymer inorganic oxide particles having UV light absorbing compound on their surface, such as the silica and zinc oxide particles functionalized with the UV light absorbing compounds described above.

A thermoplastic polymer comprising the UV light stabilizer additive forms another aspect of the invention. The surface modified inorganic particles of the invention can be added to a wide range of polymers, including polypropylene (homopolymer and copolymers), polyethylene, e.g., high density polyethylene (HDPE), medium density polyethylene (MDPE), low density polyethylene (LDPE) and linear low density polyethylene(LLDPE), polyethylene terphthalate (PET) and PDMS. The concentration of the additive of the invention is not more than 15% by weight of the polymeric formulation, e.g., from 1.0 to 12.0% by weight, and preferably from 1.0 to 8.0%. The additive is incorporated into the polymer by conventional methods, e.g., using an extruder, such as twin screw extruder to accomplish the compounding. The pellets formed are then processed and shaped into the desired article, such as films, using conventional film/sheet extrusion (e.g., blown and cast extrusion). Illustrative procedures for preparing additive-incorporated polypropylene and LLDPE films are shown below.

The additive-incorporated polymers were tested to measure migration of the UV light absorbing compounds to the surface by periodically washing and rinsing the film surface with clean hexane and measuring the UV transmission of the wash solution for traces of UV absorbing material and the UV transmission of the film (kept under different conditions as described below), to record any deterioration in its UV absorbing properties. The results reported below indicate that the UV light absorbing compounds do not migrate from the films, even after long storage periods.

EXAMPLES

Figure 1:
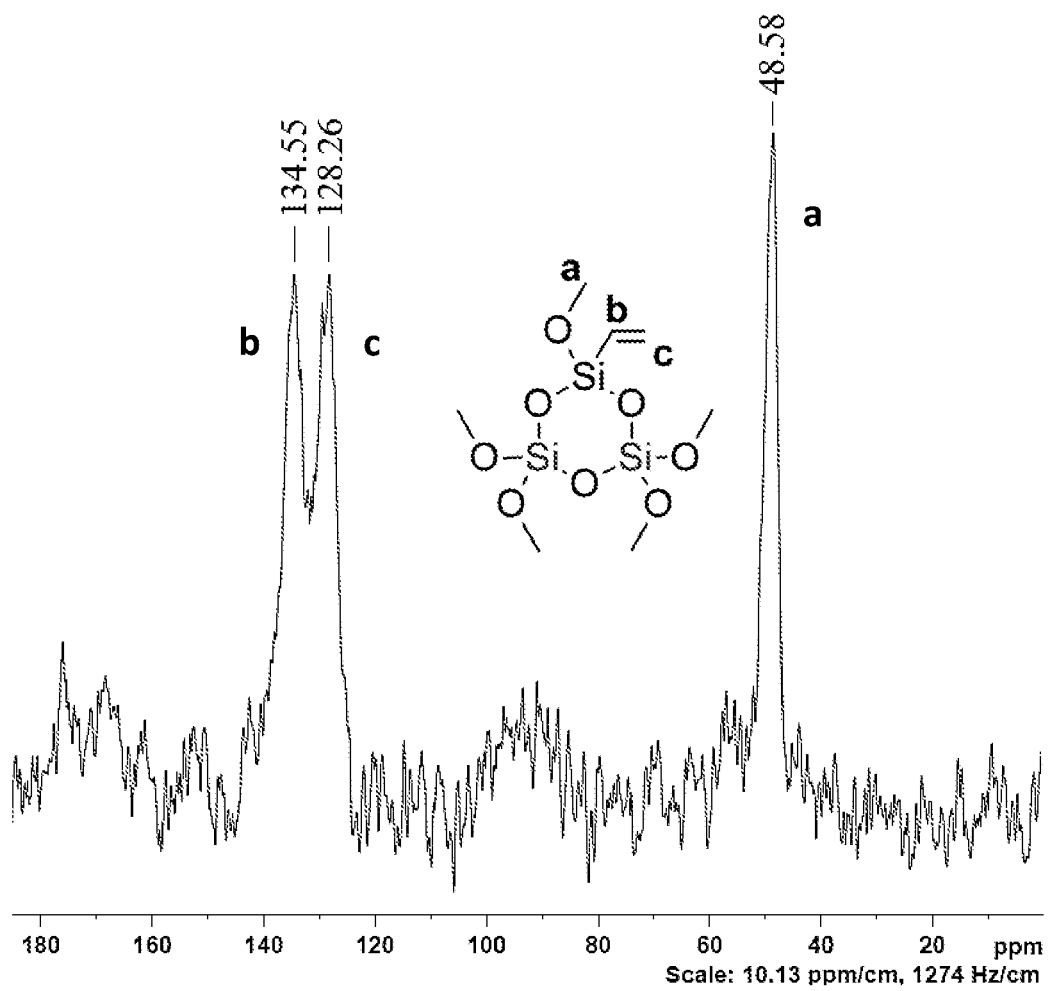
FIG. 1 is a silica-vinyl NMR spectrum.

Methods:

Thermogravimetric Analysis (TGA):

The TGA analysis was performed using a Mettler-Toledo instrument model TGA/SDTA851. 10 mg sample were heated in a standard 70 μL TGA alumina crucible, from room temperature to about 1000° C., with a heating rate of 10° C./min in nitrogen atmosphere. The concentration of UVA molecules on the silica surface was calculated according to the following Equation:

$$c\left(\frac{mmol}{g}\right) = \frac{(dc2 - dc1)*1000}{(100 - dc1)*MW\left(\frac{g}{mol}\right)}$$

where dc1 is the decomposed content (%) from 150-1000° C. of the silica-spacer, dc2 is the decomposed content (%) of Silica-spacer-UVA, MW is the molecular weight of UVA (e.g., 265.31 gr/mol in the case of 2-(2H-benzotriazol-2-yl)-4-methyl-6-(2-propenyl)phenol).

Fourier Transform Infrared Spectroscopy (FTIR): The FTIR instrument used was Scientific, Nicolet iS10.

Nuclear Magnetic Resonance (NMR) Spectroscopy: NMR spectra were acquired on a Bruker Avance II instrument, 500 MHz, CP-MAS 4 mm.

X-Ray Photoelectron Spectroscopy (XPS): The X-ray photoelectron spectrometer used is from Kratos Analytical Ltd. (Kratos Axis Ultra).

Elemental Analysis: The elemental analyzer used is PerkinElmer's 2400 Series II analyzer.

The following set of Examples (1-3) illustrates the covalent binding of UV-absorbing compound (of the benzotriazoles family) onto the surface of silica particles, with the aid of small spacer molecules having four (or six) SiH functional groups, as illustrated by the synthetic pathway depicted below.

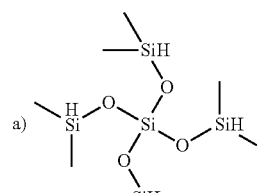

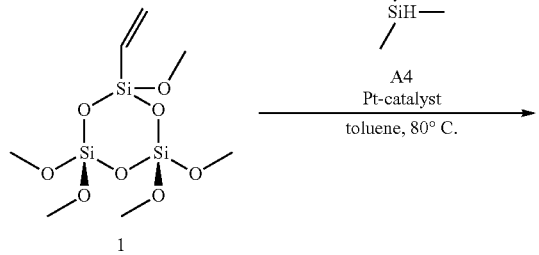

-continued

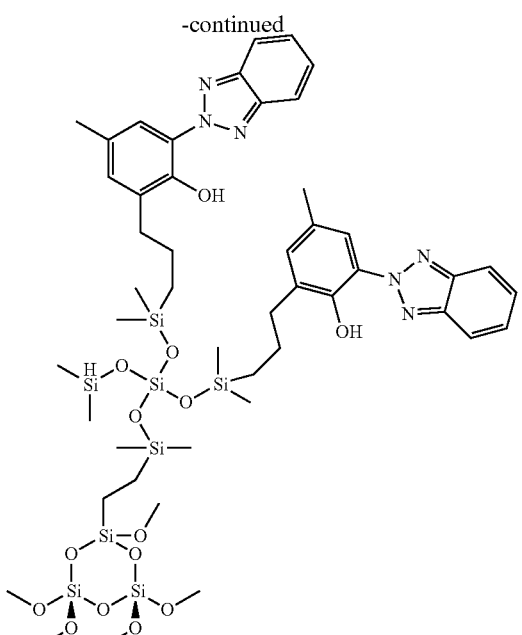

3

Preparation 1

Preparation of silica-vinyl

Preparation 1A 10 gr of silica (Cab-O-sil M5, Cabot Corporation) and 40 gr of Vinyltrimethoxysilane (VTMS; from Sigma-Aldrich, cat. num. 440221-97%) were mixed in a 3-necked flask fitted with a reflux condenser and $CaCl_2$ trap. The mixture was heated to the boiling point of VTMS (b.p. 123° C.) using an oil bath (150° C.), and was stirred with a mechanical stirrer (225 rpm) at this temperature for 11 hours. After cooling to room temperature, the silica was washed with hexane (3×250 ml) in a filter funnel with sinter glass (P4) and was dried at 1.65° C. in an oven for half hour in a petri dish to obtain 9.56 gr of silica-vinyl(1, Scheme 1).

Preparation 1B

Silica (Cab-O-sil M5, Cabot Corporation) was pressed under 0.5 ton to reduce the volume by ~1.5. 10 gr of the silica and 40 gr of Vinyltrimethoxysilane (from Sigma-Aldrich, cat. num. 440221-97%) were then mixed in a 250 ml 3-necked flask fitted with a reflux condenser and $CaCl_2$ trap. The mixture was heated to the boiling point of VTMS (b.p. 123° C.) using an oil bath (150° C.), and was stirred with a mechanical stirrer (278 rpm) at this temperature for 11 hours. After cooling to room temperature, silica was washed with hexane (4×250 ml) on a filter funnel with sinter glass (P4) and was dried at 165° C. in oven for half an hour, collecting silica-vinyl(1, Scheme 1).

Preparation 1C

Silica (Cab-O-sil M5, Cabot Corporation) was pressed under 1 ton for ten minutes. 100 gr of pressed silica and 400 gr of Vinyltrimethoxysilane (from Sigma-Aldrich, cat. num. 440221-97%) were then mixed in a 1 L cylindrical reactor fitted with a reflux condenser and mechanical stirrer (half-moon shaped, 90 mm PTFE blade). The mixture was heated to the boiling point of VTMS (b.p. 123° C.) using a heat mantel, and was stirred with a mechanical stirrer (300 rpm) at this temperature for 19 hours under nitrogen. After cooling to room temperature about 400 ml of hexane was added to the reaction mixture and after mixing, the obtained suspension was filtered on 1 L filter funnel with sinter glass (P4). The reactor was washed with an additional 400 ml of hexane and the suspension was also filtered. The silica which remains on the filter was washed with additional hexane (3×800 ml) and was dried at 160° C. in the oven for 3 hours using chemical beaker (14 cm diameter and 7.5 cm height), collecting silica-vinyl (1, Scheme 1).

Silica-vinyl (1, Scheme 1) was characterized by NMR, FTIR, and XPS analysis.

The NMR spectrum is shown in FIG. 1; the two peaks at 134 and 128 ppm are assigned to the carbon atoms of the vinyl groups added to the silica surface. The peak at ~48 ppm is assigned to the unreacted methoxy group (due to steric considerations, on the average approximately two of the three —$OCH_3$ groups of vinyltrimethoxysilane participate in the bond formation reaction with the silica surface).

Figure 2:
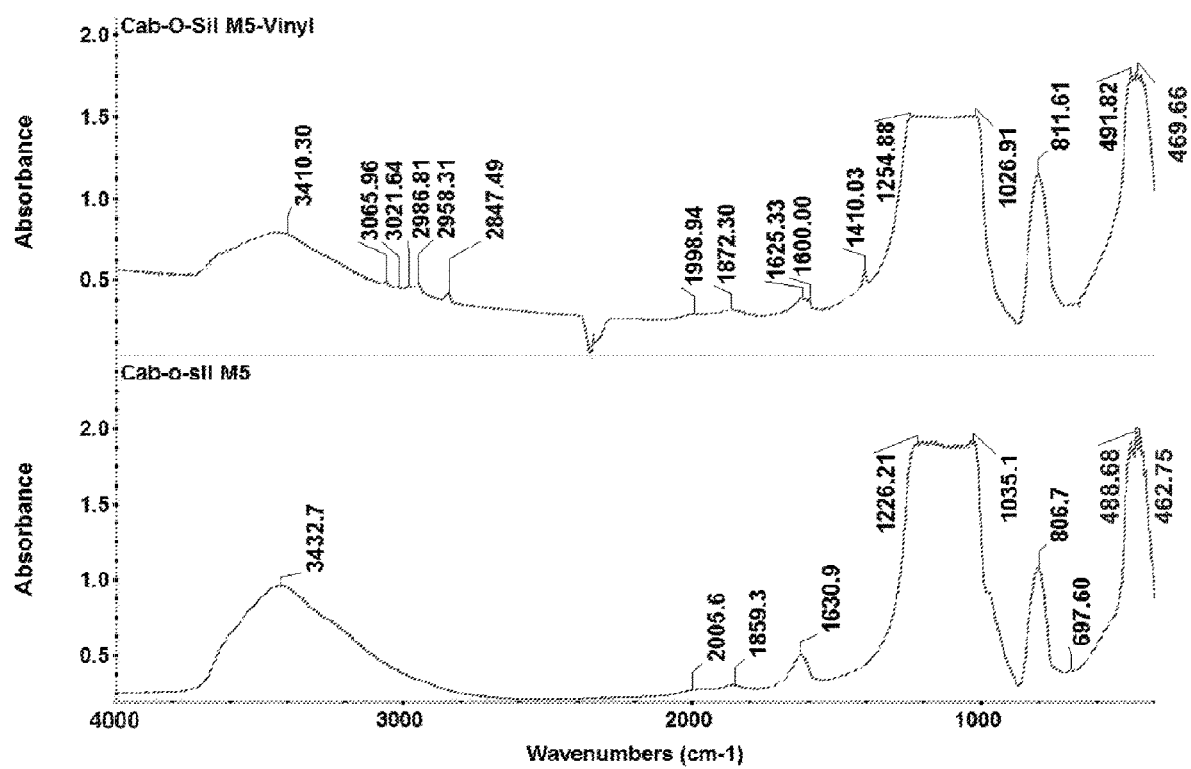
FIG. 2 are original, unmodified commercial silica (bottom) and the silica-vinyl (top) FTIR spectra.

FIG. 2 shows FTIR spectrum for the original, unmodified commercial silica (bottom) and the silica-vinyl (top).

The characteristic peaks of the unmodified silica are:

a large band at about 3433 cm-1, attributed to the presence of the O—H stretching frequency of silanols groups and also the adsorbed water;

a sharp band at 1631 $cm^{-1}$ assigned to the bending vibrations of molecular water;

a broad strong peak at 1254-1026 $cm^{-1}$, assigned to the Si—O—Si asymmetric bond stretching vibrations. This peak has some "shoulder" at ~980 $cm^{-1}$, that corresponds to asymmetric vibration of Si—OH.

A band at 806 $cm^{-1}$, assigned to a network Si—O—Si symmetric bond stretching vibration; and a band at 460 $cm^{-1}$ associated with a network Si—O—Si bond bending vibration.

The spectrum of vinyl-modified silica exhibits an appearance of new, weak peaks at 3060 $cm^{-1}$ and 3020 $cm^{-1}$ which were attributed to C—H bands of Si—CH=$CH_2$ group. The peak at 1600 $cm^{-1}$ is typical of C=C vibrations and the peak appearing at 1410 $cm^{-1}$ is assigned to C—H deformation vibrations of the =$CH_2$ group. The peaks at 2986 $cm^{-1}$, 2958 $cm^{-1}$ and 2987 $cm^{-1}$ were attributed to C—H bands of the remained methoxy groups (the characteristic Si—$OCH_3$ band, expected to be found at around 1000-1100 $cm^{-1}$, is masked by the strong Si—O—Si absorption).

Lastly, it should be pointed out that in the modified silica, the broad band at 3433 $cm^{-1}$ has been significantly decreased comparing to that of the original sample. This decrease, together the disappearance of the "shoulder" at ~980 $cm^{-1}$, clearly indicate that surface silanol groups took part in the chemical reaction, i.e., vinyltrimethoxysilane was covalently attached to the silica surface via the surface silanol groups.

The successful attachment of vinyltrimethoxysilane to the surface of the silica particles is also demonstrated by the XPS analysis tabulated below. The modification of the silica surface is expected to lead to decreased oxygen/carbon and silicon/carbon ratios measured on the silica surface. This is indeed shown by the results set forth in Table 1 below:

TABLE 1

| Sample | O1s (atomic %) | N1s (atomic %) | C1s (atomic %) | Si2p (atomic %) | O/C | Si/C |
|---|---|---|---|---|---|---|
| Original silica | 69.95 | 0.00 | 1.46 | 28.58 | 47.91 | 19.58 |
| Silica-vinyl | 63.25 | 0.00 | 9.57 | 27.18 | 6.61 | 2.84 |

Example 1

Preparation of Silica-Spacer A4-UVA

The UVA Molecule is 2-(2'-hydroxyphenyl)benzotriazole Derivative

Preparation of Silica-Spacer A4

10.00 gr of silica-vinyl of Preparation 1A (which was dried for 1 h at 160° C.), 4.70 gr of tetrakis(dimethylsiloxy) silane (A4; from ABCR, cat. num. AB111396-97%) and 54 gr of toluene were then mixed with mechanical stirrer in 500 ml 1-necked-flask, followed by the addition of Pt catalyst {cis-dichlorobis(diethyl sulfide)platinum(II), from Sigma-Aldrich, cat. num. 432849}. The catalyst was added as 2% solution in toluene (425 µl).

The resultant suspension was stirred for 5 hours at 80° C. with a mechanical stirrer (300 rpm). After cooling to room temperature, the product was washed with toluene (2×500 ml) and hexane (3×500 ml) on a filter funnel with sinter glass (P4). The product was placed in a petri dish and dried in an oven at 70° C. oven for one hour, to obtain 9.95 gr of silica-A4 (2, Scheme 1).

Preparation of Silica-Spacer A4-UVA 9.45 gr of silica-spacer A4, 5.33 gr of 2-(2H-benzotriazol-2-yl)-4-methyl-6-(2-propenyl)phenol {UVA; from Sigma-Aldrich, cat. num. 559857-99%} and 60 gr of toluene were mixed with a mechanical stirrer in 250 ml 1-necked-flask, followed by the addition of Pt catalyst {cis-dichlorobis (diethyl sulfide)platinum(II), from Sigma-Aldrich, cat. num. 432849}. The catalyst was added as 2% solution in toluene (445 µl).

The resultant suspension was stirred for 16 hours at 80° C. After cooling to room temperature, the product was washed with toluene (3×400 ml) and hexane (4×500 ml) on a filter funnel with sinter glass (P4). UV absorbance of the last portion of hexane was measured (250-450 nm) to ensure that all UVA was washed away. The product was placed in a petri dish and dried in an oven at 70° C. for one hour, to obtain 9.29 gr of silica-spacer A4-UVA (3, Scheme 1).

Figure 3:
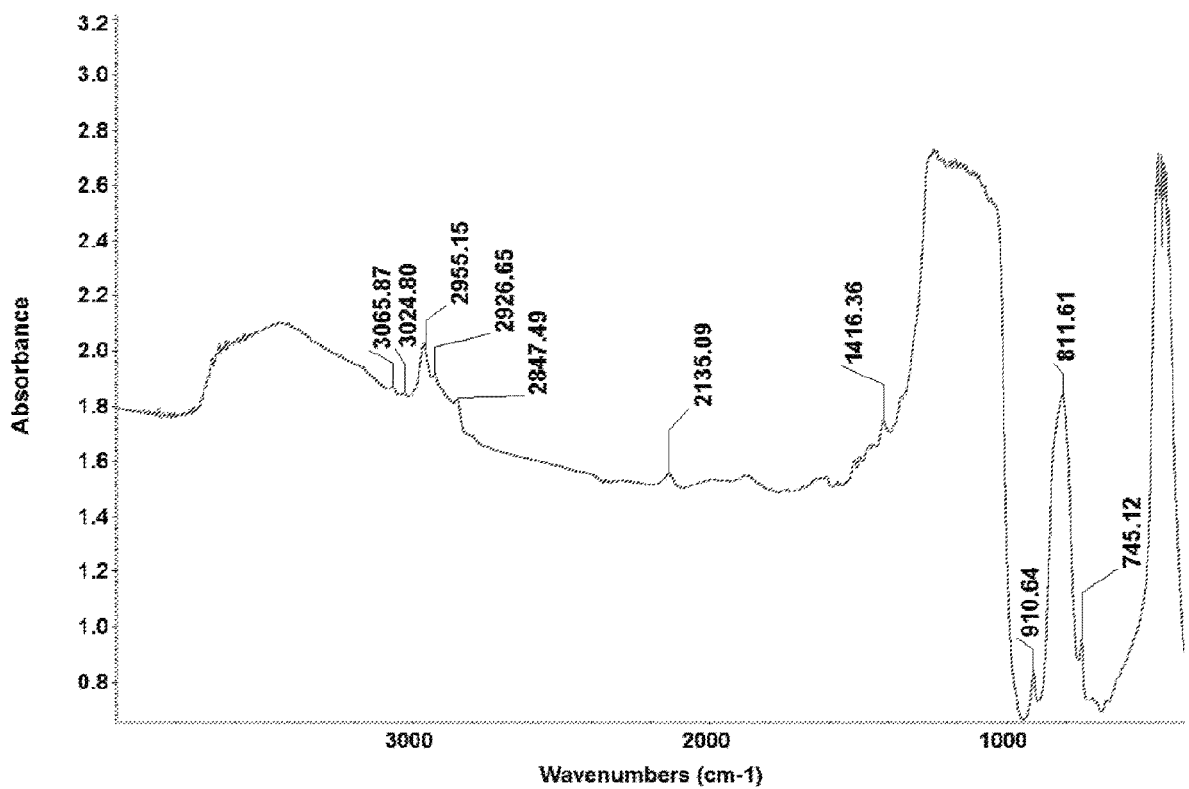
FIG. 3 is an A4-UVA silica-spacer FTIR spectrum.

The so-formed additive was characterized by FTIR, TGA and elemental analysis. The FTIR spectrum shown in FIG. 3 exhibits a peak at 745 cm$^{-1}$, assigned to the UVA molecule that has been successfully attached to the particle. The peaks at 2135 cm$^{-1}$ and 910 cm-1 are due to the presence of unreacted SiH groups which did not form chemical bonds with the UVA molecule. The concentration of the UVA molecules applied onto the silica particles was calculated on the basis of TGA analysis according to the method set forth above and was found to be 0.26 mmol/g (dc1 and dc2 values measured were 4.87% and 11.40%, respectively). The concentration determined by TGA shows fairly good agreement with the result obtained by elemental analysis [measured % C: 9.62; calculated concentration: 0.28 mmol/g (C e.a.)]

Example 2

Preparation of Silica-Spacer A6-UVA

The UVA Compound is 2-(2'-hydroxyphenyl)benzotriazole Derivative

Preparation of Silica-Spacer A6

1 gr of silica-vinyl of Preparation 1A, 1.32 g of Poly (dimethylsiloxane-co-methylhydrosiloxane), trimethylsilyl terminated {A6; from Sigma-Aldrich, cat. num. 482196-average Mn ~950} and 5.22 gr of toluene were then mixed in 40 ml vial, followed by the addition of Pt catalyst {cis-dichlorobis(diethyl sulfide)platinum(II), from Sigma-Aldrich, cat. num. 432849}. The catalyst was added as 2% in toluene (50 µl).

The resultant suspension was stirred for 5 hours at 80° C. After cooling to room temperature, the product was washed with toluene (3×50 ml) and hexane (4×50 ml) on filter funnel with sinter glass (P4). The product was placed in a petri dish and dried in an oven at 70° C. oven for one hour, to obtain 0.982 gr of silica-spacer A6.

Preparation of Silica-Spacer A6-UVA 750.8 mg of silica-spacer A6, 424.8 mg of 2-(2H-benzotriazol-2-yl)-4-methyl-6-(2-propenyl)phenol {UVA; from Sigma-Aldrich, cat. num. 559857-99%} and 4.78 gr of toluene were mixed in 20 ml vial, followed by the addition of Pt catalyst {cis-dichlorobis(diethyl sulfide)platinum(II), from Sigma-Aldrich, cat. num. 432849}. The catalyst was added as 2% solution in toluene (36 µl).

The resultant suspension was stirred for 8 hours at 80° C. After cooling to room temperature, the product was washed with toluene (4×40 ml) and hexane (3×40 ml) on a filter funnel with sinter glass (P4). UV absorbance of the last portion of hexane was measured (250-450 nm) to ensure that all UVA was washed away. The product was placed in a petri dish and dried in an oven at 70° C. for one hour, to obtain 0.625 gr of silica-spacer A6-UVA.

Figure 4:
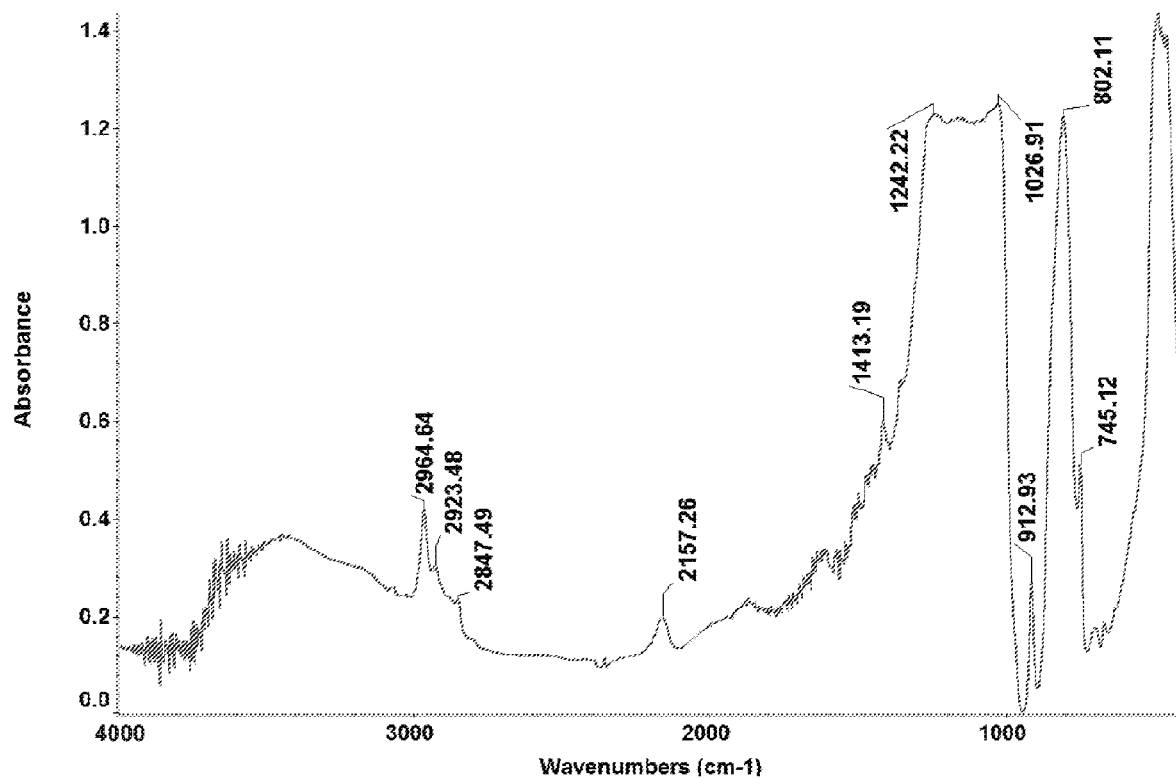
FIG. 4 is an A6-UVA silica-spacer FTIR spectrum.

The so-formed additive was characterized by FTIR and TGA. The FTIR spectrum shown in FIG. 4 exhibits the characteristic peak at 745 cm$^{-1}$, which indicates the presence of the UVA molecule on the silica surface. The concentration of the UVA molecules loaded onto the silica particles, calculated on the basis of TGA analysis according to the method set forth above, was found to be 0.31 mmol/g (the dc1 and dc2 values measured were 6.08% and 13.73%, respectively).

Example 3

Preparation of Silica-Spacer A6y-UVA

The UVA Molecule 2-(2'-hydroxyphenyl)benzotriazole Derivative

Preparation of Silica-Spacer A6y 1 gr of silica-vinyl of Preparation 1A, 780 mg of A6y (prepared according to a procedure described in U.S. Pat.

No. 5,691,435) and 3.6 gr of toluene were mixed in 40 ml vial, followed by the addition of Pt catalyst {cis-dichlorobis (diethyl sulfide)platinum(II), from Sigma-Aldrich, cat. num. 432849}. The catalyst was added as 2% solution in toluene (36 µl).

The resultant suspension was stirred for 5 hours at 80° C. After cooling to room temperature, the product was washed with toluene (4×40 ml) and hexane (4×40 ml) on a filter funnel with sinter glass (P4). The product was placed in a petri dish and dried in an oven at 70° C. oven for one hour, to obtain 0.984 gr of silica-spacer A6y.

Preparation of Silica-Spacer A6y-UVA 627.8 mg of silica-spacer A6y, 354.8 mg of 2-(2H-benzotriazol-2-yl)-4-methyl-6-(2-propenyl)phenol {UVA; from Sigma-Aldrich, cat. num. 559857-99%} and 2.26 gr of toluene were mixed in 20 ml vial, followed by the addition of Pt catalyst {cis-dichlorobis(diethyl sulfide)platinum(II), from Sigma-Aldrich, cat. num. 432849}. The catalyst was added as 2% solution in toluene (28 µl).

The resultant suspension was stirred for 8 hours at 80° C. After cooling to room temperature, the product was washed with toluene (4×40 ml) and hexane (3×40 ml) on a filter funnel with sinter glass (P4). UV absorbance of the last portion of hexane was measured (250-450 nm) to ensure that all UVA was washed away. The product was placed in a petri dish and dried in an oven at 70° C. for one hour, to obtain 0.518 gr of silica-spacer A6y-UVA.

Figure 5:
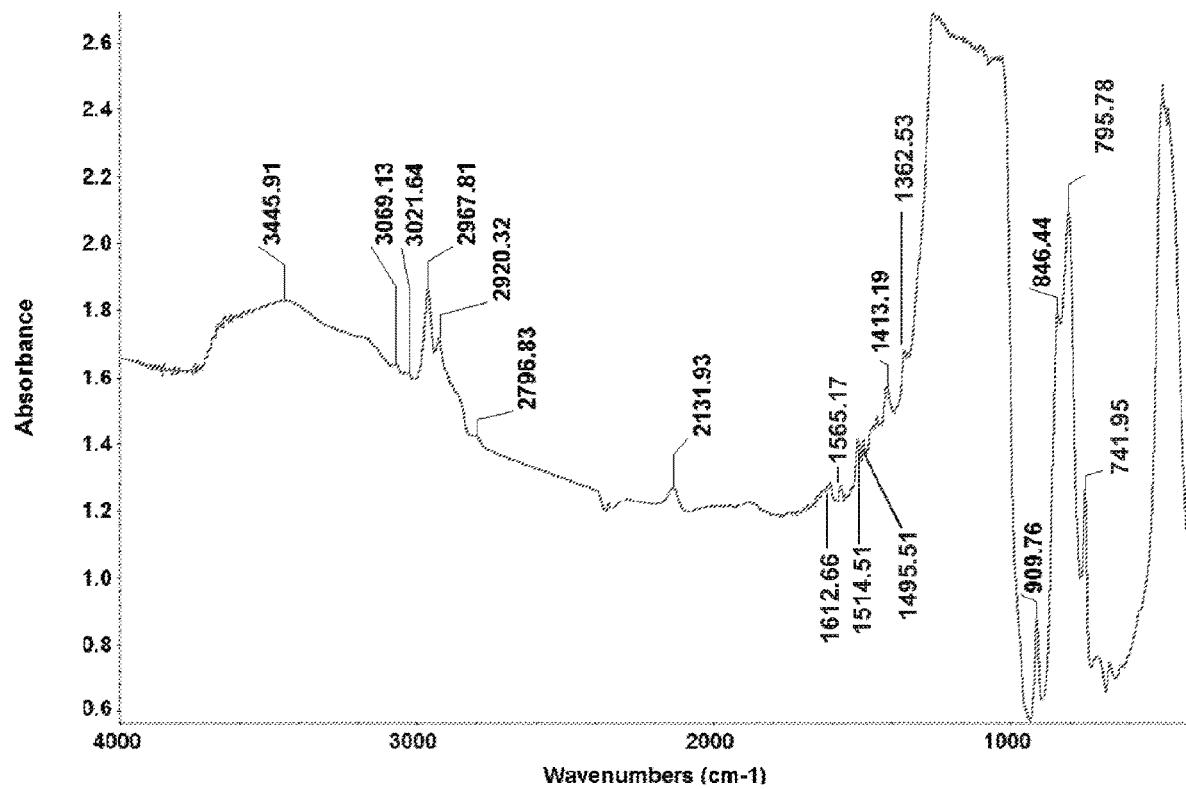
FIG. 5 is an A6y-UVA silica-spacer FTIR spectrum.

The so-formed additive was characterized by FTIR and TGA. The FTIR spectrum shown in FIG. 5 exhibits the characteristic peak at 745 $cm^{-1}$, which indicates the presence of the UVA molecule on the silica surface. The concentration of the UVA molecules present on the silica particles, calculated on the basis of TGA analysis according to the method set forth above, was found to be 0.51 mmol/g (the dc1 and dc2 values measured were 6.13% and 19.04%, respectively).

The following set of Examples (4-8) illustrates the covalent binding of a UV light absorbing compound (of the benzotriazoles family) onto the surface of silica particles, with the aid of a long spacer: poly (methyl hydrogen slioxane), consisting of about 75 repeating units (namely, Si—H functional groups).

Example 4

Preparation of Silica-Spacer MH30-UVA

The UVA Compound is
2-(2'-hydroxyphenyl)benzotriazole Derivative

Preparation of Silica-Spacer MH30

Silica-vinyl of Preparation 1A (1 gr) was dried for 1 h at 160° C. The silica-vinyl, 3.29 gr of Andisil MH30 (from AB Specialty Silicones) and 2.6 gr of toluene were mixed with a magnetic stirrer in 20 ml flask, followed by the addition of Pt catalyst {cis-dichlorobis(diethyl sulfide)platinum(II), from Sigma-Aldrich, cat. num. 432849}. The catalyst was added in the form of 2% solution in toluene (45 µl).

The resultant suspension was stirred for 8 hours at 50° C. with a magnetic stirrer. After cooling to room temperature, the product was washed with toluene (50 ml) and hexane (4×50 mL) on a filter funnel with sinter glass (P4). The product was placed in a petri dish and dried in an oven at 45° C. for one hour, to obtain 1.2 gr of silica—MH30.

Preparation of Silica-Spacer MH30-UVA 0.5 gr of silica-spacer MH30, 1.5 gr of 2-(2H-benzotriazol-2-yl)-4-methyl-6-(2-propenyl)phenol (Sigma-Aldrich, cat. num. 559857-99%) and 3 gr of toluene were mixed with a magnetic stirrer in 20 ml flask, followed by the addition of Pt-catalyst {cis-dichlorobis(diethyl sulfide)platinum(II), from Sigma-Aldrich, cat. num. 432849}. The catalyst was added as 2% solution in toluene (80 µl).

The resultant suspension was stirred for 8 hours at 80° C. After cooling to room temperature, the product was washed with toluene (3×100 ml) and hexane (3×100 ml) on a filter funnel with sinter glass (P4). UV absorbance of the last portion of hexane was measured (250-450 nm) to ensure that all UVA was washed away. The product was placed in a petri dish and dried in an oven at 70° C. for one hour to obtain 0.45 gr of silica-spacer MH30-UVA.

Figure 6:
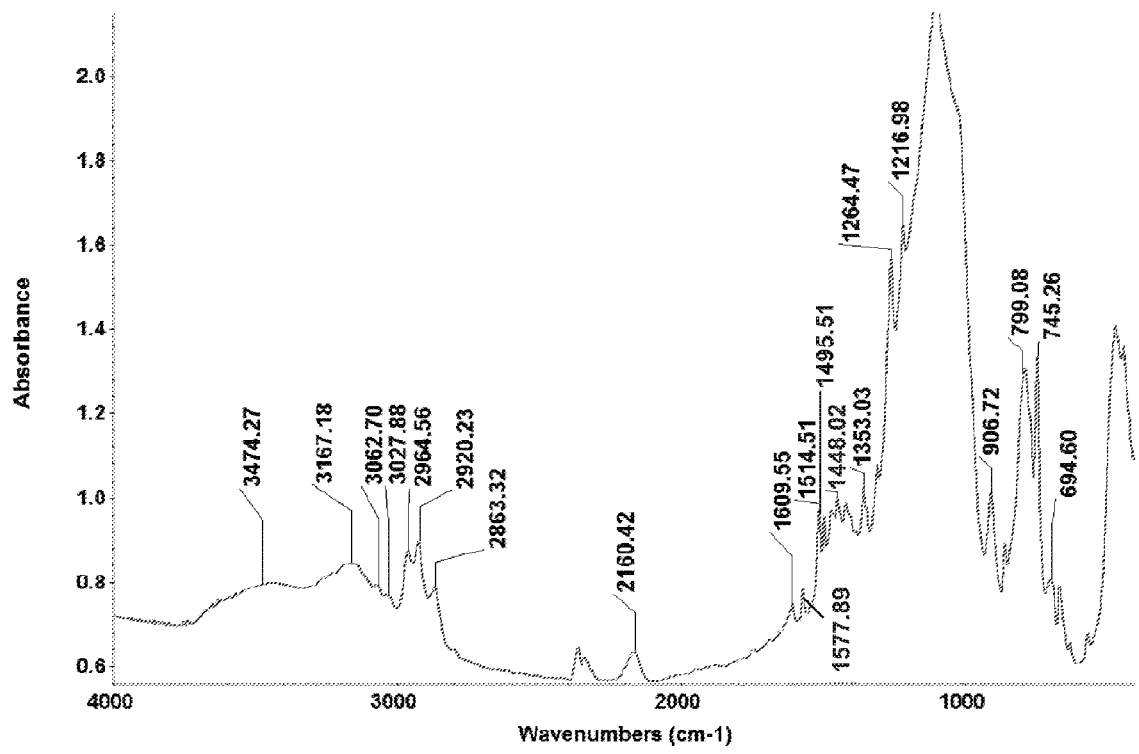
FIG. 6 is an MH30-UVA silica-spacer FTIR spectrum.

The so-formed additive was characterized by FTIR and TGA. The FTIR spectrum is shown in FIG. 6; the presence of the intensive characteristic peaks at 745 $cm^{-1}$, 1217 $cm^{-1}$ and 1264 $cm^{1}$, assigned to the UVA molecule, is noted. The concentration of the UVA molecules present on the silica particles, calculated on the basis of TGA analysis according to the method set forth above, was found to be 2.35 mmol/g (the dc1 and dc2 values measured were 5.19% and 41.63%, respectively).

Example 5

Preparation of Silica-Spacer MH30-UVA

The UVA Molecule is
2-(2'-hydroxyphenyl)benzotriazole Derivative

Preparation of Silica-Spacer MH30

50 gr of silica-vinyl of Preparation 1C (dried for 1 h at 160° C.), 106.4 gr of Andisil MH30 and 124.7 gr of toluene were mixed in a 1 L cylindrical reactor fitted with a mechanical stirrer (half-moon shaped, 90 mm PTFE blade), followed by the addition of Pt catalyst {cis-dichlorobis (diethyl sulfide)platinum(II), from Sigma-Aldrich, cat. num. 432849}. The catalyst was added as 2% solution in toluene (1.9 ml).

The resultant suspension was stirred for 16 hours at 50° C. with mechanical stirrer (340 rpm). After cooling to room temperature, 300 ml of toluene were added and the reaction mixture was vigorously mixed. Then the suspension was allowed to stand for half an hour, and after sedimentation, the solid was separated by decantation of the solvent. The product was washed twice with hexane (240 ml, centrifugation-decanting, 3000 rpm, 10 min each time). After the final decantation the solid was introduced to 1 L filter funnel with sinter glass (P4) and was washed with hexane (4×500 ml). The last portion of hexane was evaporated and the residue was weighed to ensure that all unreacted polymer was washed away. The product was placed in a petri dish and dried in an oven at 50° C. for 1 hour, to obtain 45 gr of silica—MH30.

Preparation of Silica-Spacer MH30-UVA 43.3 gr of silica-spacer MH30, 129 gr of 2-(2H-benzotriazol-2-yl)-4-methyl-6-(2-propenyl)phenol (consisting of equal amounts of a material purchased from Sigma-Aldrich, cat. num. 559857-99% and a recycled material recovered from a previous batch as described below) and 258 gr of toluene were mixed in a 1 L cylindrical reactor fitted with a mechanical stirrer (half-moon shaped, 90 mm PTFE blade), followed by the addition of Pt-catalyst {cis-dichlorobis (diethyl sulfide)platinum(II), from Sigma-Aldrich, cat. num. 432849}. The catalyst was added as 2% solution in toluene (7 ml).

The resultant suspension was stirred for 16 hours at 80° C. with mechanical stirrer (340 rpm). After cooling to room temperature, the product was washed with toluene (5×800 ml), hexane (3×800 ml) on 1 L filter funnel with sinter glass (P4). UV absorbance of the last portion of hexane was measured (250-450 nm) to ensure that all UVA was washed away. The filtrates were combined and concentrated by evaporation and unreacted 2-(2H-benzotriazol-2-yl)-4-methyl-6-(2-propenyl)phenol was collected and reused. The product was placed in a petri dish and dried in an oven at 70° C. for 1.5 hours to obtain 55 gr of silica-Spacer MH30-UVA.

Example 6

Preparation of Silica-Spacer MH30-UVA

The UVA Molecule is 2-(2'-hydroxyphenyl)benzotriazol Derivative

Preparation of Silica-Spacer MH30

14.39 gr of silica-vinyl of Preparation 1C (dried for 1 h at 160° C.), 31.58 gr of Andisil MH30 and 36.75 gr of toluene were mixed in a 500 ml three-necked flask fitted with a mechanical stirrer, followed by the addition of Pt catalyst {cis-dichlorobis(diethyl sulfide)platinum(II), from Sigma-Aldrich, cat. num. 432849; the catalyst was added as 2% solution in toluene (0.55 ml)}.

The resultant suspension was stirred for 16 hours at 50° C. with mechanical stirrer (340 rpm). After cooling to room temperature, 90 ml of toluene were added and the reaction mixture was thoroughly mixed. Then the suspension was allowed to stand for half an hour, and after sedimentation, the solid was separated by decantation of the solvent. The silica was washed four times with hexane (4×250 ml, centrifugation-decanting, 3000 rpm, 10 min each time). The last portion of hexane was evaporated and the residue was weighed to ensure that all unreacted Andisil MH30 was washed away. The product was placed in a petri dish and dried in an oven at 50° C. to obtain 14.82 gr of silica-spacer MH30.

Preparation of Silica-Spacer MH30-UVA 0.787 gr of silica-spacer MH30, 0.787 gr of 2-(2H-benzotriazol-2-yl)-4-methyl-6-(2-propenyl)phenol (Sigma-Aldrich, cat. num. 559857-99%) and 4.92 gr of toluene were mixed with magnetic stirrer in 20 ml flask, followed by the addition of Pt catalyst {cis-dichlorobis(diethyl sulfide)platinum(II), from Sigma-Aldrich, cat. num. 432849; the catalyst was added as 2% in toluene (105 µl)}.

The resultant suspension was stirred for 16 hours at 80° C. After cooling to room temperature, the product was washed with toluene (2×50 ml), hexane (3×50 ml) on a filter funnel with sinter glass (P4). UV absorbance of the last portion of hexane was measured (250-450 nm) to ensure that all unreacted beznotriazole was washed away. The product was placed in a petri dish and dried in an oven at 70° C. for 1 hour.

Example 7

Investigation of the Properties of Poly(Methyl Hydrogen Siloxane) as a Spacer for Attaching UV Light Absorbing Compound onto the Surface of Silica Particles In the set of measurements reported in this example, poly(methyl hydrogen siloxane (MH30, available from Andisil) was used as the spacer. 2-(3-Allyl-2-hydroxy-5-methylphenyl)-2H-benzotriazole was used as the UV light absorbing compound.

Figure 7:
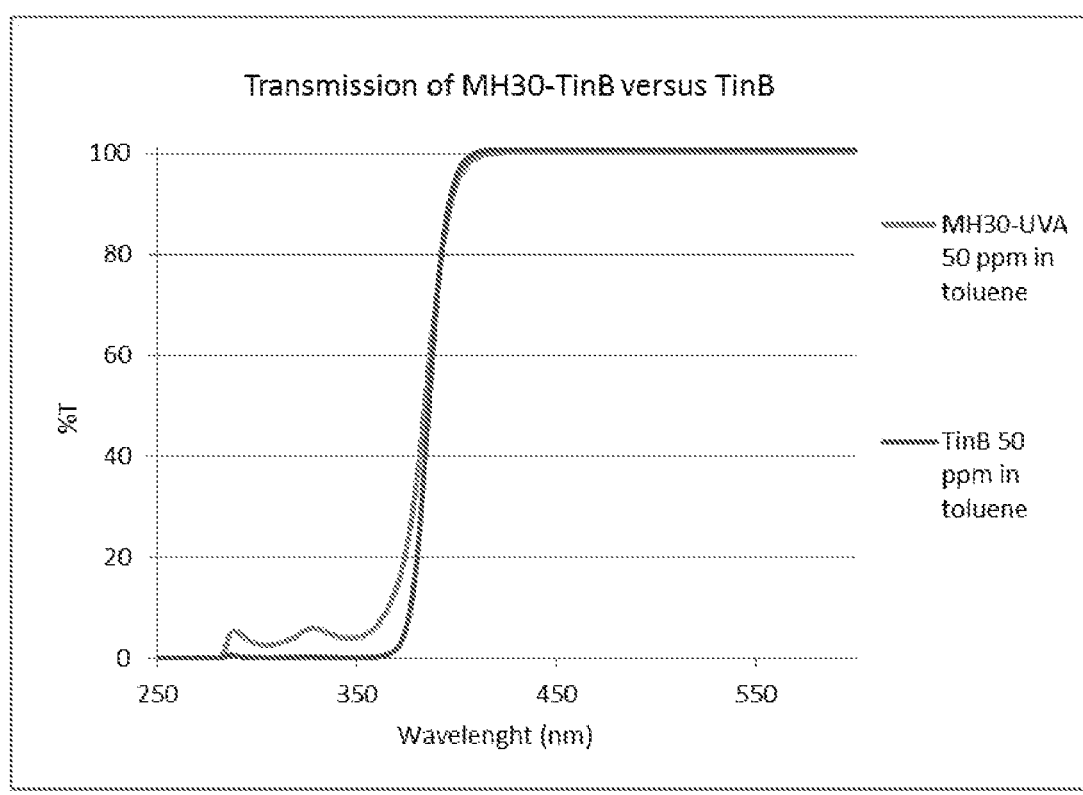
FIG. 7 shows the absorbance spectra of 2-(3-Allyl-2-hydroxy-5-methylphenyl)-2H-benzotriazole and its reaction product with MH30 (TinB and MH30-TinB, respectively).

Optical Properties: FIG. 7 shows the transmission spectra in the UV-Vis range of 2-(3-Allyl-2-hydroxy-5-methylphenyl)-2H-benzotriazole and the product of a reaction between MH30 and 2-(3-Allyl-2-hydroxy-5-methylphenyl)-2H-benzotriazole:

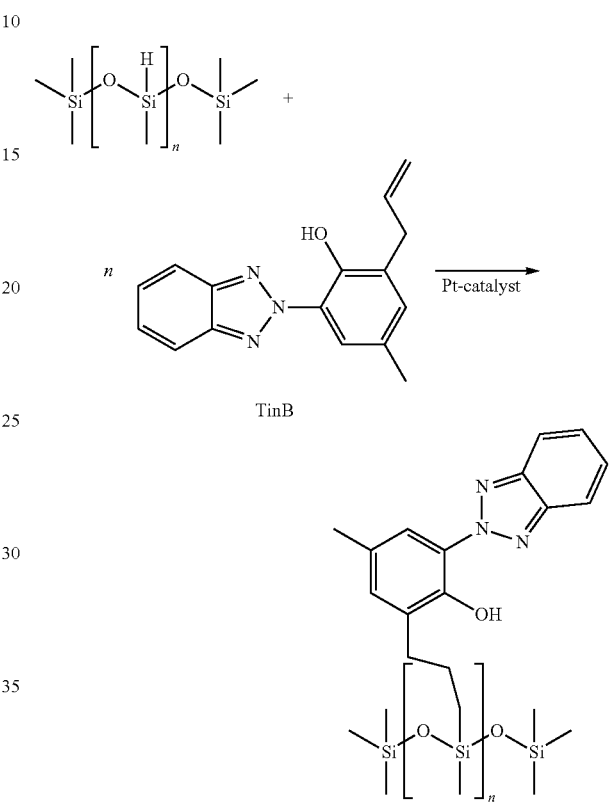

The addition reaction of was carried out in toluene, at 50° C., under the same conditions illustrated in detail in previous examples, to give poly(methyl hydrogen siloxane) with pendent 2-(3-propyl-2-hydroxy-5-methylphenyl)-2H-benzotriazole. To obtain the spectra, 50 ppm of 2-(3-Allyl-2-hydroxy-5-methylphenyl)-2H-benzotriazole in toluene, and similarly, 50 ppm of the reaction product in toluene were used. The spectra shown in FIG. 7 indicate that the absorbance of 2-(3-Allyl-2-hydroxy-5-methylphenyl)-2H-benzotriazole and its reaction product with MH30 are comparable (indicated TinB and MH30-TinB or MH30-TinB, respectively, in the spectrum of FIG. 7).

Figure 8:
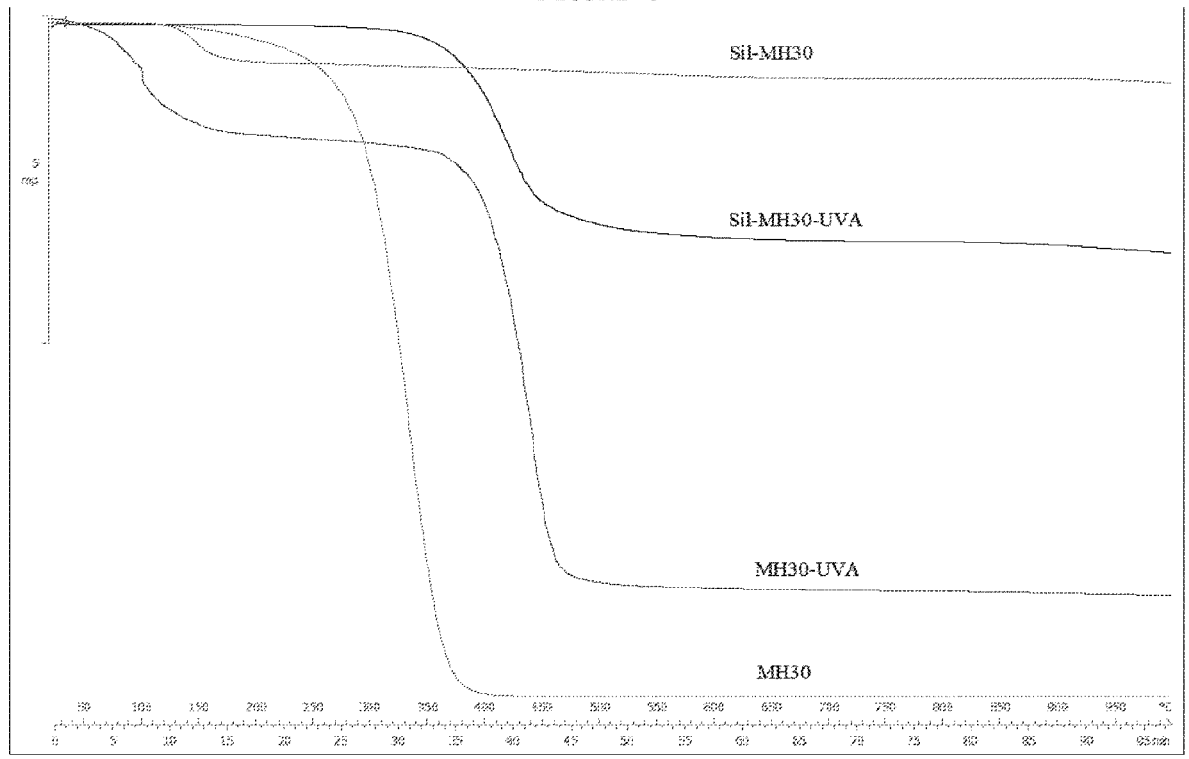
FIG. 8 is a thermogram of TGA analysis of poly(methyl hydrogen siloxane) (MH30); the reaction product of 2-(3-Allyl-2-hydroxy-5-methylphenyl)-2H-benzotriazole and MH30 (MH30-UVA); silica particles modified by MH30 (Sil-MH30) and an additive of the invention, consisting of silica particles with the MH30 spacer and 2-(3-Allyl-2-hydroxy-5-methylphenyl)-2H-benzotriazole chemically bonded to the spacer (Sil-MH30-UVA).

Thermal Properties: Thermal stability was studied using TGA analysis (which measures the weight loss of a sample as sample temperature is increased). The following samples were subjected to TGA analysis, and the results are shown in the thermogram in FIG. 8:

poly(methyl hydrogen siloxane) alone (designated "MH30" in the thermogram of FIG. 8);

The reaction product of poly(methyl hydrogen siloxane) and 2-(3-Allyl-2-hydroxy-5-methylphenyl)-2H-benzotriazole, as set forth above (designated "MH30-UVA" in the thermogram of FIG. 8);

The reaction product of the silica particles and MH30, as described in previous examples (designated "Sil-MH30" in the thermogram of FIG. 8); and The additive of the invention prepared as described in previous examples, consisting of the silica particles with the MH30 spacer attached to the silica surface and 2-(3-Allyl-2-hydroxy-5-methylphenyl)-2H-benzotriazole chemically bonded to the spacer (designated "Sil-MH30-UVA" in the thermogram of FIG. 8).

The TGA indicates that the decomposition of the poly (methyl hydrogen siloxane), namely, MH30, starts at a temperature of about 250° C. The thermal stability of MH30 is reduced upon attaching it to the surface the silica particle, seeing that the decomposition of the "Sil-MH30" conjugate begins at 150° C. Thus, the coupling to the silica particles has an unfavorable influence on the thermal stability of MH30. However, the chemical bonding of 2-(3-Allyl-2-hydroxy-5-methylphenyl)-2H-benzotriazole to the chains of MH30 has a favorable effect on the thermal stability, with the reaction product MH30-UVA displaying increased thermal stability, seeing that the decomposition occurs at higher temperature of about 450° C. Most importantly, in the additive of the invention, Sil-MH30-UVA, the favorable effect of 2-(3-Allyl-2-hydroxy-5-methylphenyl)-2H-benzotriazole on the thermal stability of MH30 overwhelms the negative effect of the coupling to the silica particles.

Example 8

Preparation of Silica-UVA

The UVA is 2-hydroxy benzophenone Derivative 1.00 gr of silica (Cab-O-sil M5, Cabot Corporation), 0.96 gr of 2-Hydroxy-4-(3-triethoxysilylpropoxy)-diphenylketone (95%, from Gelest) and 17.40 gr of toluene were mixed with a magnetic stirrer in 50 ml flask fitted with a reflux condenser and $CaCl_2$ trap. The mixture was heated to the boiling point of toluene (b.p. 111° C.) using an oil bath (120° C.), and was stirred with a magnetic stirrer at this temperature for 5 hours.

After cooling to room temperature, the product was washed with toluene (3×250 ml) and hexane (2×250 ml) on a filter funnel with sinter glass (P4). UV absorbance of the last portion of hexane was measured (250-450 nm) to ensure that all of the Hydroxy-4-(3-triethoxysilylpropoxy)-diphenylketone was washed away. The product was placed in a petri dish and dried in an oven at 70° C. for 1 hour to obtain 1.08 gr of silica-UVA.

Figure 9:
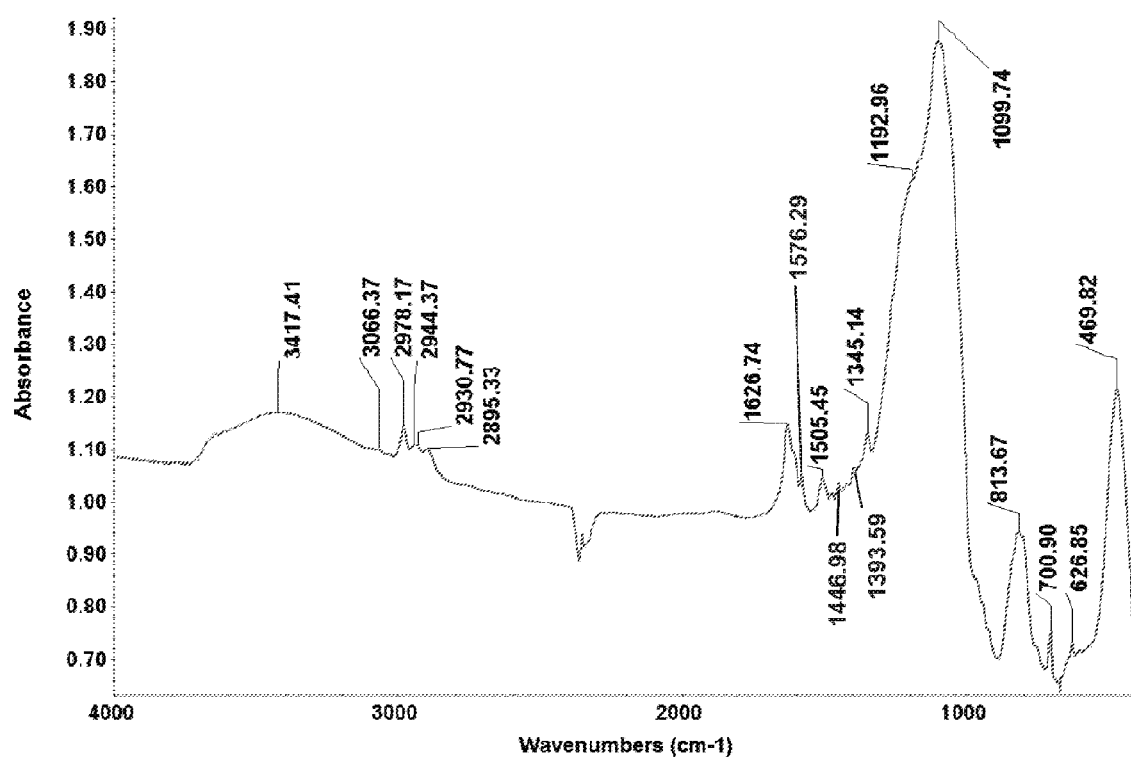
FIG. 9 is a silica-UVA FTIR spectrum.

The so-formed additive was characterized by FTIR and TGA. The FTIR spectrum is shown in FIG. 9; the peak at 1626.7 $cm^{-1}$, corresponds to the intensive band of carbonyl group within the UVA molecule. The concentration of the UVA molecules present on the silica particles, calculated on the basis of TGA analysis was found to be 0.315 mmol/g.

Example 9

Preparation of Silica-UVA

The UVA is 2-hydroxy benzophenone Derivative

In the experiment reported in this example, colloidal silica in a solvent was used (Nanopol& from Evonik Industries AG). The silica starting material consists of a suspension of monodispersed silica particles population in isopropanol (30%-40% by weight). The concentration of the silanol groups on the surface of the silica starting material was measured by TGA and was found to be 1.81 mmol/g (the TGA was performed following solvent evaporation in the temperature range from room temperature to 1100° C.).

Figure 10:
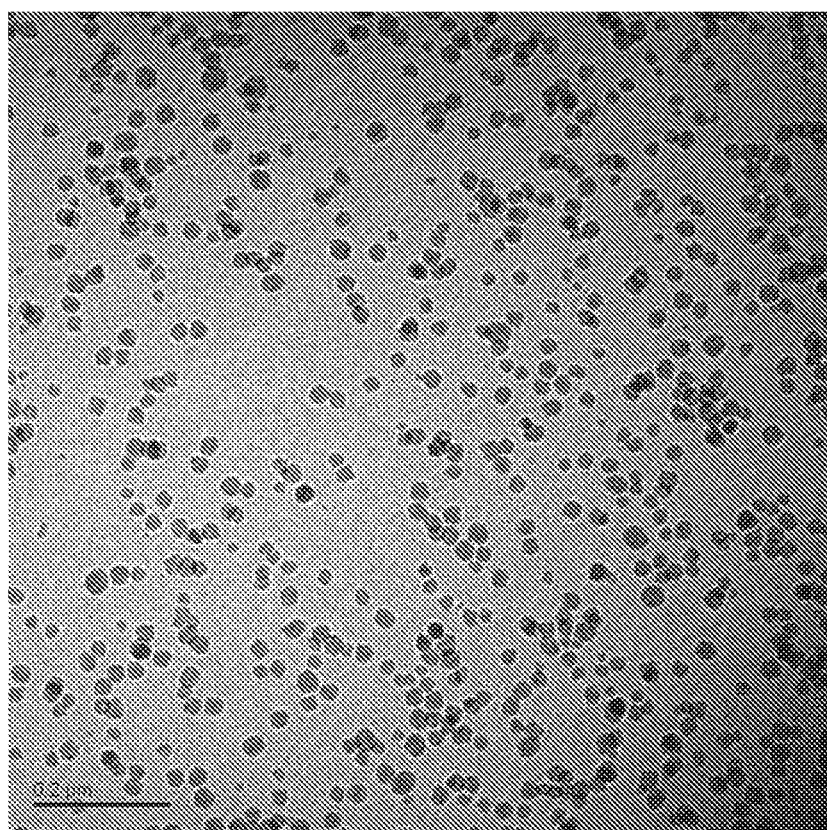
FIG. 10 is a Cryo-TEM image of silica-UVA showing dispersibility of discrete particles.

The reaction between the silica particles and the UV light absorbing compound, 2-Hydroxy-4-(3-triethoxysilylpropoxy)-diphenylketone, took place in isopropanol at the reflux temperature (82° C.). The molar ratio between the OH surface groups of the silica and the 2-Hydroxy-4-(3-triethoxysilylpropoxy)-diphenylketone was 3:1, and the reaction was allowed to proceed for twenty four hours under reflux. Under the chosen conditions of reactants ratio and reaction time, the suspension retained its clarity through the reaction, indicating that it did not undergo aggregation. The particles were examined by Cryo-Tem analysis (at concentration of 5% in isopropanol), and the Cryo-Tem image in FIG. 10 reveals the dispersibility of the discrete particles. The concentration of the UV light absorbing compound was measured (TGA) to be 0.15 mmol/g.

Example 10

Preparation of ZnO-UVA

The UVA is 2-hydroxy benzophenon Derivative 36.03 gr of ZnO (Zano®20, from Umicore Zinc Chemicals), 53.60 gr of 2-Hydroxy-4-(3-triethoxysilylpropoxy)-diphenylketone and 144.13 gr of toluene were stirred with a mechanical stirrer in 250 ml flask fitted with a reflux condenser and $CaCl_2$ trap. The mixture was heated to the boiling point of toluene (b.p. 111° C.) using an oil bath (120° C.), and was stirred (250 rpm) at this temperature for 65 hours. After cooling to room temperature, ZnO particles were washed with toluene and hexane on a filter funnel with sinter glass. UV absorbance of the last portion of hexane was measured (250-450 nm) to ensure that all UVA was washed away. ZnO was dried at 70° C. in an oven for 1 hour in a petri dish to obtain 35.4 gr of ZnO-UVA.

The so-formed additive was characterized by FTIR, TGA and XPS analysis.

Figure 11:
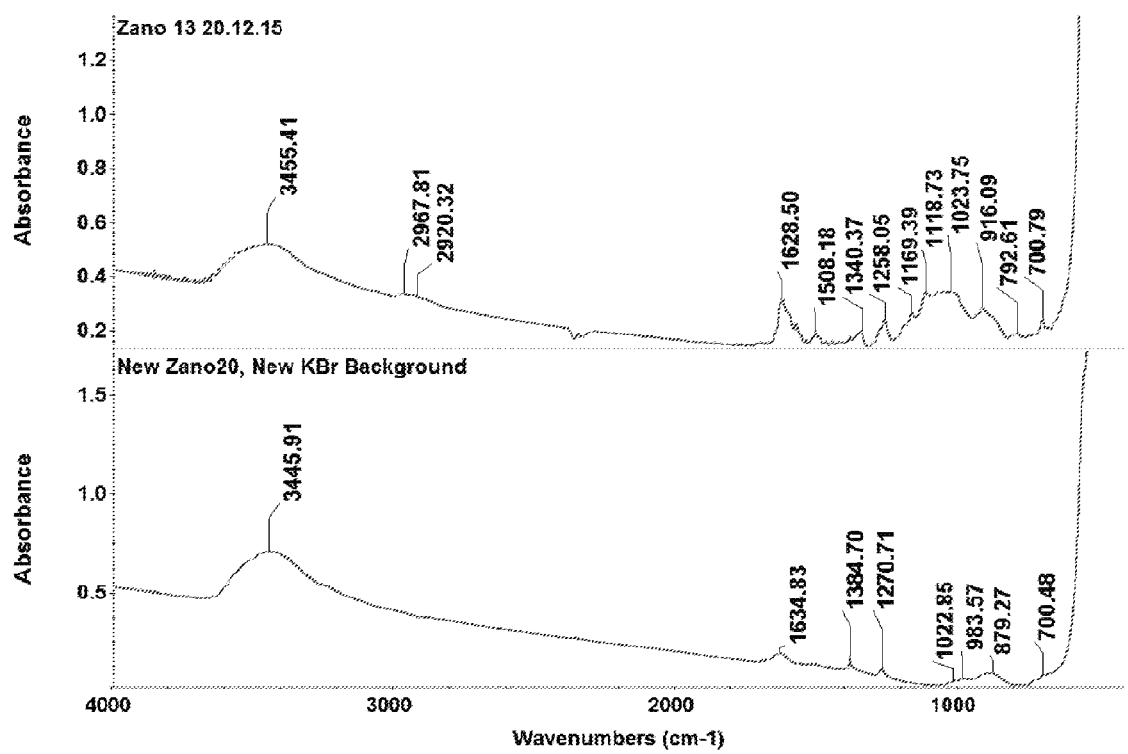
FIG. 11 shows ZnO (bottom) and UVA-modified ZnO (top) FTIR spectra.

The FTIR spectrum is shown in FIG. 11 (lower spectrum corresponds to ZnO and upper curve corresponds to UVA-modified ZnO). It is seen that the spectrum of UVA-modified ZnO exhibits new weak peaks, at 2967 cm and 2920 $cm^{-1}$, attributed to C—H bands. The strong peak at 1628.5 $cm^{-1}$ is assigned to the carbonyl group within the UVA molecule. The fingerprint region also exhibits new characteristic peaks of the UVA molecule. The broad peak around 1118-1023 $cm^{-1}$ is attributed to Si—O—Si and Si—O—C bands; and Si—O—Zn absorption band is positioned at 916 $cm^{-1}$.

TGA analysis indicates that the calculated concentration of the UVA molecule on the surface of the particle is 0.09 mmol/g.

XPS was used for the analysis of the composition of the original ZnO particle and the surface-modified ZnO particles, to determine the atomic percent of the elements on the particles surface. The data is tabulated in Table 2 and Table 3, respectively:

TABLE 2

| | (original ZnO) | | | | |
|---|---|---|---|---|---|
| Name | Peak BE | FWHM eV | Area (P) CPS. eV | Atomic % | Q |
| C1s | 284.75 | 1.20 | 2971.98 | 9.34 | 1 |
| O1s | 529.80 | 1.12 | 40861.81 | 46.81 | 1 |
| Zn2p3 | 1020.94 | 1.50 | 193072.40 | 43.85 | 1 |

TABLE 3

(ZnO-UVA)

| Name | Peak BE | FWHM eV | Area (P) CPS. eV | Atomic % | Q |
|---|---|---|---|---|---|
| C1s | 284.92 | 1.78 | 2666.74 | 25.81 | 1 |
| O1s | 530.93 | 2.20 | 13462.47 | 45.78 | 1 |
| Zn2p3 | 1023.48 | 2.34 | 39986.96 | 24.65 | 1 |
| Si2p | 101.98 | 1.41 | 321.54 | 3.76 | 1 |

The attachment of the UVA molecule, 2-Hydroxy-4-(3-triethoxysilylpropoxy)-diphenylketone, to the ZnO particle through the reaction shown below:

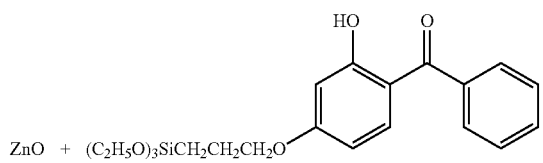

is indicated by a new peak located at ~102 eV, assigned to the binding energy (BE) of silicon (note that the UVA molecule contains Si atoms). The atomic ratio between oxygen and zinc measured in the original ZnO particles is approximately 1:1; this ratio has increased to about 2:1 in the reaction product, owing to the oxygen atoms of the UVA molecule and to the masking of surface zinc. Carbon content in the reaction product is higher than that measured for the commercial ZnO particles. Lastly, the deconvolution of XPS spectra for the Zn2p line shows the presence of three different binding energies (~1022.1 eV, ~1023.3 eV and ~1024.3 eV) for zinc in the reaction product, as tabulated in Table 4. On the other hand the spectrum of the original ZnO particle contains only one binding energy band (corresponding to a single chemical state of Zn).

TABLE 4

| Name | Peak BE | FWHM eV | Area (P) CPS. eV | Atomic % | Q |
|---|---|---|---|---|---|
| Zn2p Scan B | 1022.06 | 1.88 | 6524.62 | 16.31 | 1 |
| Zn2p Scan C | 1023.29 | 1.54 | 14095.63 | 35.27 | 1 |
| Zn2p Scan A | 1024.26 | 1.69 | 19336.71 | 48.41 | 1 |

Example 11

Polypropylene Film Preparation

This example illustrates the preparation of polypropylene film with the additive of the present invention. The composition of the film consists of 95% polypropylene and 5% additive (by weight).

Polypropylene homopolymer (Repol H034SG from 'Reliance Polymers') and the additive of the invention as prepared in Example 1 were compounded by melt mixing in a EUROLAB Digital 16 ('Prism') twin screw co-rotating extruder (D=16 mm, L/D=24), using a uniform temperature profile of 200-225° C., and operated at a screw speed of 250 rpm, to obtain 100 gr batch size compounds. The materials were mixed in a plastic bag, and were added to the extruder at the same upstream feed port. The melt compound strands were continuously cooled down to solidify under water at room temperature, and were then cut to pellets with a granulating machine. The pre-compounded pellets were dried before further processing (70° C., overnight, vacuum).

The pellets were then fed to MICROTRUDER ('RandCastle') Cast-film single screw extruder (D=13 mm, L/D=20), using a temperature profile of 200-220° C. The machine was operated at a screw speed of 70 rpm, to obtain film of 50 micron wall thickness and width of 150 mm.

The additive-incorporated polymers were tested to measure migration of the UV light absorbing compounds to the surface by periodically washing and rinsing the film surface with clean hexane and measuring the UV transmission of the wash solution for traces of UV absorbing material and the UV transmission of the film to record any deterioration in the UV absorbing properties of the film.

Figure 12:
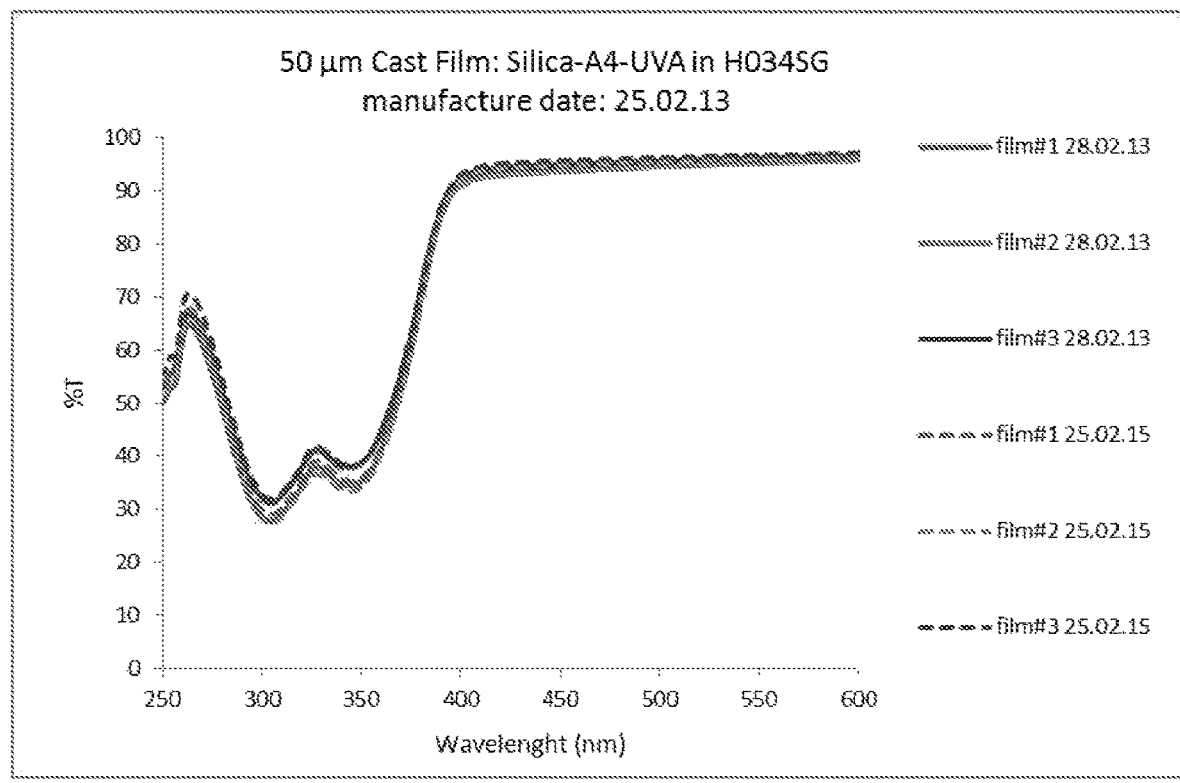
FIG. 12 shows the UV spectra of polypropylene films with the additives of the invention stored under different conditions.

The UV spectra shown in FIG. 12 were recorded shortly after the manufacture of the films, and approximately two years after manufacture. It is noted that after the first measurement in hexane, the films were stored in glass vials under the following conditions (see reference to Films "1", "2" and "3" in FIG. 12):

Film #1 in air @30° C.

Film #2 in ethanol 95% @30° C.

Film #3 in air @60° C.

The results show that in all cases, the level of UV-blocking did not decrease with the passage of time, indicating that surface migration of the UV light absorbing compounds is suppressed efficiently with the aid of the additives of the invention.

Example 12

LLDPE Film Preparation

This example illustrates the preparation of oriented 15 μm thick multilayered film (three layers) with the additive of the invention incorporated into the 7 μm thick core layer. The composition of the film consists of 93% LLDPE and 7% additive (by weight).

LLDPE (NOVA Chemicals Sclair® FP112-A) and the additive of the invention as prepared in Example 4 were compounded by melt mixing in a 16 mm twin screw extruder (Prism, England) L/D ratio of 25:1, using a temperature profile of 160-225° C., and operated at a screw speed of 200-230 rpm, to obtain 1500 gr batch size compounds. The materials were mixed and were fed to the extruder through the same upstream feed port. The melt compound strands were continuously cooled down to solidify under water at room temperature, and were then cut to pellets with a granulating machine. The pre-compounded pellets were dried before further processing.

Pre-compounded material samples were fed to MICROTRUDER ('RandCastle') Cast-film single screw extruder (D=13 mm, L/D=20) to produce a three-layer casted film. The processes were done at a temperature profile of 200-220° C. for extruder A and 200-230° C. for extruder C. The machine was operated at a screw speed of 64 rpm for extruder A and 115 rpm for extruder C, to obtain three-layer film with total thickness of 400 μm and width of 150 mm. Then the 400 μm film was stretched to the final dimensions.

Figure 13:
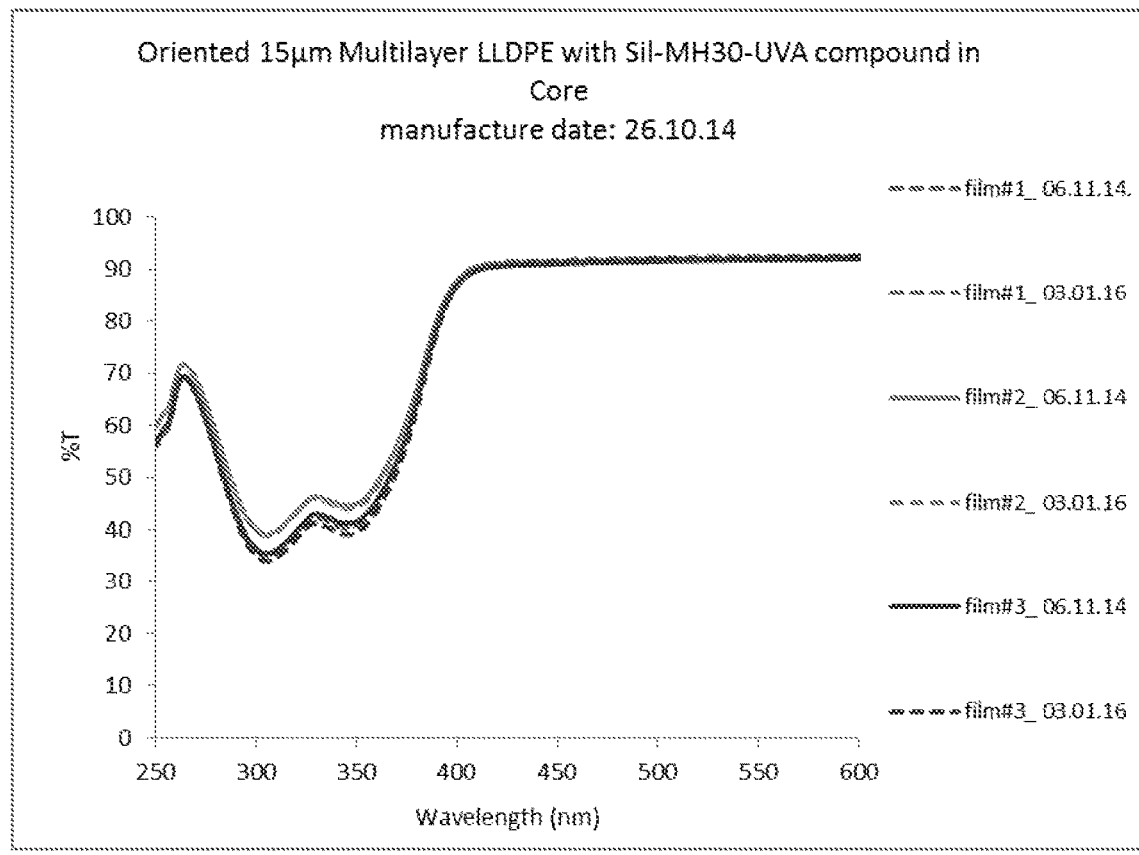
FIG. 13 shows the UV spectra of LLDPE films with the additives of the invention stored under different conditions.

UV spectra were recorded a few days after the manufacture of the films, and then again about thirteen months later (Films "1", "2" and "3" have the same meaning as indicated above). No migration of the additive to the surface of the film occurred during this one year time period, as indicated by the UV spectra shown in FIG. 13, showing that the UV-blocking displayed by the films shortly after manufacture, and a year later, are essentially comparable.

The invention claimed is:

1. An extruded sheet comprising a composition of a thermoplastic polymer and an ultraviolet light absorber, wherein the ultraviolet light absorber comprises particles of inorganic oxide having at least one UV light-absorbing compound on surfaces of the particles, wherein the inorganic oxide is selected from the group consisting of:

silica, wherein the at least one UV light-absorbing compound is chemically bonded to an organosilicon spacer provided on the surface of the silica particles, wherein a carbon atom of the at least one UV light-absorbing compound is covalently bonded to a silicon atom of the organosilicon spacer, and wherein the nearest environment of the silicon atom consists of the carbon atom and either one oxygen atom and two hydrocarbyl groups or two oxygen atoms and one hydrocarbyl group; and zinc oxide.

2. The extruded sheet of claim 1, wherein the inorganic oxide is silica.

3. The extruded sheet of claim 2, wherein the at least one UV light absorbing compound is hydroxyphenyl-benzotriazole compound, which is covalently bonded to the silicon atom of the organosilicon spacer through an alkylene chain (—$CH_2$—)$_n$ attached to a phenyl ring of the hydroxyphenyl-benzotriazole compound.

4. The extruded sheet of claim 3, wherein the hydroxyphenyl-benzotriazole compound is 2-(2'-hydroxyphenyl) benzotriazole compound:

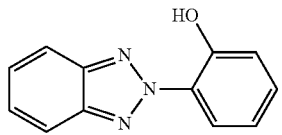 [SMILES: Oc1ccccc1-n1nc2ccccc2n1]

wherein the phenyl ring is substituted with $CH_2$—$CH_2$—$CH_2$— chain, and optionally with one or more additional groups.

5. The extruded sheet of claim 2, wherein the at least one UV light-absorbing compound is 2-hydroxy benzophenone compound.

6. The extruded sheet of claim 1, wherein a concentration of the at least one UV light-absorbing compound in the ultraviolet light absorber is at least 0.3 mmol/g.

7. A process of preparing the extruded sheet of claim 1, the process comprising compounding the composition into pellets, feeding the pellets into an extruder, and processing the pellets to form the extruded sheet of claim 1, wherein the composition comprises an ultraviolet light absorber additive that was formed by introducing onto the surface of inorganic oxide particles a first functional group, reacting the so-formed inorganic oxide particles modified with said first group with a spacer having a plurality of a second functional group; reacting the so-formed inorganic particles modified with said second functional groups with UV light absorbing compound, and isolating from the reaction mixture said ultraviolet light absorber additive.

8. The process of claim 7, wherein the inorganic oxide is silica.

9. The process of claim 8, wherein the surfaces of the inorganic oxide particles have a first functional group that is a carbon-carbon double bond.

10. The process of claim 9, wherein the carbon-carbon double bond is introduced onto the silica surface by reaction of the silica particles with a vinyl compound of the formula

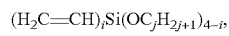

($H_2C$=$CH$)$_i$Si(O$C_j H_{2j+1}$)$_{4-i}$, wherein $1 \leq i \leq 3$ and $1 \leq j \leq 3$.

11. The process of claim 9, wherein the silica modified with the carbon-carbon double bond is reacted with an organosilicon compound having silicon hydride (SiH) functional groups, wherein the number of SiH groups in the organosilicon compound is not less than four.

12. The process of claim 11, wherein the organosilicon compound comprises from four to ten silicon hydride groups, and the nearest environment of the silicon atom in the silicon hydride group is occupied with two hydrocarbyl groups and one oxygen atom.

13. The process of claim 12, wherein the organosilicon spacer comprises not less than twenty silicon hydride groups and has a backbone chain possessing silicon hydride in a repeating unit.

14. The process of claim 13, wherein the spacer is poly (methyl hydrogen siloxane) consisting of 50-80 repeating units.

15. The process of claim 7, wherein the at least one UV light absorbing compound is of the hydroxyphenyl-benzotriazole class.

16. The process of claim 15, wherein the at least one UV light absorbing compound is 2-(3-Allyl-2-hydroxy-5-methyl-phenyl)-2H-benzotriazole:

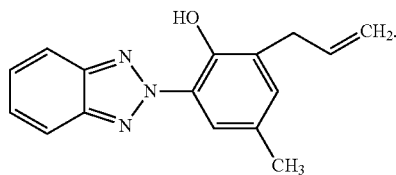 [SMILES: C=CCc1cc(C)cc(-n2nc3ccccc3n2)c1O]

17. The extruded sheet of claim 1, wherein the thermoplastic polymer is polypropylene or polyethylene.

18. The extruded sheet of claim 1, comprising a linear low-density polyethylene.

* * * * *